United States Patent
Scott

(10) Patent No.: US 8,245,450 B2
(45) Date of Patent: Aug. 21, 2012

(54) RE-DEPLOYABLE MOBILE ABOVE GROUND SHELTER

(75) Inventor: Oscar T Scott, Amarillo, TX (US)

(73) Assignee: Oscar T. Scott, IV, Amarillo, TX (US)

( * ) Notice: Subject to any disclaimer, the term of this patent is extended or adjusted under 35 U.S.C. 154(b) by 0 days.

(21) Appl. No.: 13/328,000

(22) Filed: Dec. 16, 2011

(65) Prior Publication Data

US 2012/0151854 A1    Jun. 21, 2012

Related U.S. Application Data

(63) Continuation-in-part of application No. 12/579,004, filed on Oct. 14, 2009, now Pat. No. 8,136,303.

(60) Provisional application No. 61/105,245, filed on Oct. 14, 2008, provisional application No. 61/106,416, filed on Oct. 17, 2008.

(51) Int. Cl.
    *E04H 9/14*    (2006.01)

(52) U.S. Cl. ....... 52/2.11; 52/2.25; 52/79.5; 52/DIG. 11

(58) Field of Classification Search .................. 52/2.13, 52/2.14, 2.16, 2.25, 79.5, 84, 146, 149, 169.12, 52/198, DIG. 3, DIG. 11; 454/243, 250, 454/359, 363
    See application file for complete search history.

(56) References Cited

U.S. PATENT DOCUMENTS

| | | | |
|---|---|---|---|
| 1,122,375 A | 12/1914 | Engle | |
| 1,122,431 A | 12/1914 | Sexton | |
| 1,689,246 A * | 10/1928 | Knapen | 454/250 |
| RE24,895 E | 11/1960 | Clements | |
| 2,976,875 A | 3/1961 | Hoffman | |
| 3,170,472 A | 2/1965 | Cushman | |
| 3,302,552 A | 2/1967 | Walsh | |
| 3,335,529 A | 8/1967 | Gedney | |
| 3,342,444 A | 9/1967 | Nelson | |
| 3,509,811 A | 5/1970 | Topp | |
| 3,601,934 A * | 8/1971 | Dietz | 52/2.19 |
| 3,685,426 A | 8/1972 | Rosa | |
| 3,788,207 A | 1/1974 | Doherty, II | |
| 3,817,009 A | 6/1974 | Elder | |
| 3,893,383 A | 7/1975 | Jones | |

(Continued)

FOREIGN PATENT DOCUMENTS

WO     9317208 A1    9/1993

OTHER PUBLICATIONS

Oscar T. Scott IV, U.S. Appl. No. 12/579,004, Non-Final Office Action dated Feb. 1, 2011.

(Continued)

*Primary Examiner* — Christine T Cajilig
(74) *Attorney, Agent, or Firm* — Yudell Isidore Ng Russell PLLC

(57) ABSTRACT

Work crews temporarily operating in remote areas can be subject to dangers such as tornados, hurricanes and explosive blast waves. A re-deployable mobile aboveground protective shelter suitable for use in such environments utilizes retractable stabilizing arms and/or structures that leverage air pressure differential to resist uplift, overturning and sliding. Because the protective shelter does not rely exclusively upon excessive weight to counter wind forces, the protective shelter can be quickly, easily and inexpensively redeployed to new sites.

33 Claims, 24 Drawing Sheets

U.S. PATENT DOCUMENTS

| | | |
|---|---|---|
| 3,984,947 A | 10/1976 | Patry |
| 4,016,730 A | 4/1977 | DeVilliers |
| 4,162,597 A | 7/1979 | Kelly |
| 4,223,486 A | 9/1980 | Kelly |
| 4,268,066 A | 5/1981 | Davis |
| 4,512,243 A | 4/1985 | Ballard et al. |
| 4,538,508 A | 9/1985 | Ballard |
| 4,557,081 A | 12/1985 | Kelly |
| 4,593,504 A | 6/1986 | Bonnici et al. |
| 4,608,792 A | 9/1986 | Gerber |
| 4,635,412 A | 1/1987 | Le Poittevin |
| 4,641,571 A | 2/1987 | Anderson et al. |
| 4,652,321 A | 3/1987 | Greko |
| 4,759,272 A | 7/1988 | Zaniewski |
| 4,803,111 A | 2/1989 | Mansell |
| 4,843,794 A | 7/1989 | Holtgreve |
| 4,848,653 A | 7/1989 | Van Becelaere |
| 4,850,166 A | 7/1989 | Taylor |
| 4,876,950 A | 10/1989 | Rudeen |
| 4,888,930 A | 12/1989 | Kelly |
| 4,909,135 A | 3/1990 | Greko |
| 4,963,761 A | 10/1990 | Wight |
| 4,965,971 A | 10/1990 | Jean-Jacques et al. |
| 5,009,149 A | 4/1991 | MacLeod et al. |
| 5,431,240 A | 7/1995 | Merritt |
| 5,734,215 A | 3/1998 | Taghezout et al. |
| 5,749,780 A | 5/1998 | Harder et al. |
| 5,766,071 A | 6/1998 | Kirkwood |
| 5,966,956 A | 10/1999 | Morris et al. |
| 6,006,482 A | 12/1999 | Kelly |
| 6,325,712 B1 | 12/2001 | Lawless, III et al. |
| 6,484,459 B1 | 11/2002 | Platts |
| 6,591,564 B2 | 7/2003 | Cusimano |
| 7,001,266 B2 | 2/2006 | Jones et al. |
| 7,036,786 B1 | 5/2006 | Schura |
| 7,543,594 B2 | 6/2009 | Novak |
| 2006/0048458 A1 | 3/2006 | Donald et al. |

OTHER PUBLICATIONS

Oscar T. Scott IV, U.S. Appl. No. 12/579,004, Final Office Action dated Jun. 14, 2011.

Oscar T. Scott IV, U.S. Appl. No. 12/579,004, Notice of Allowance dated Dec. 1, 2011.

* cited by examiner

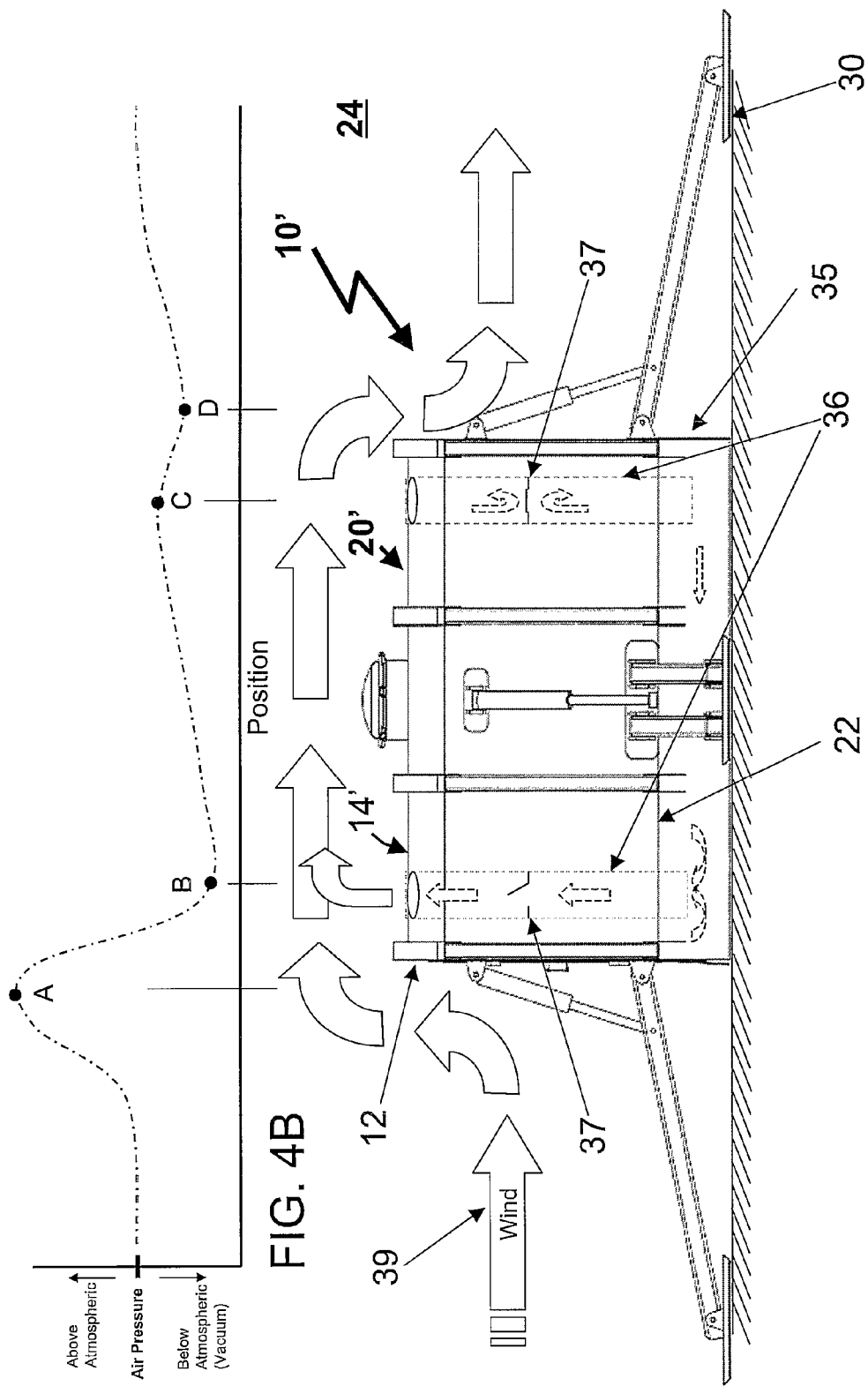

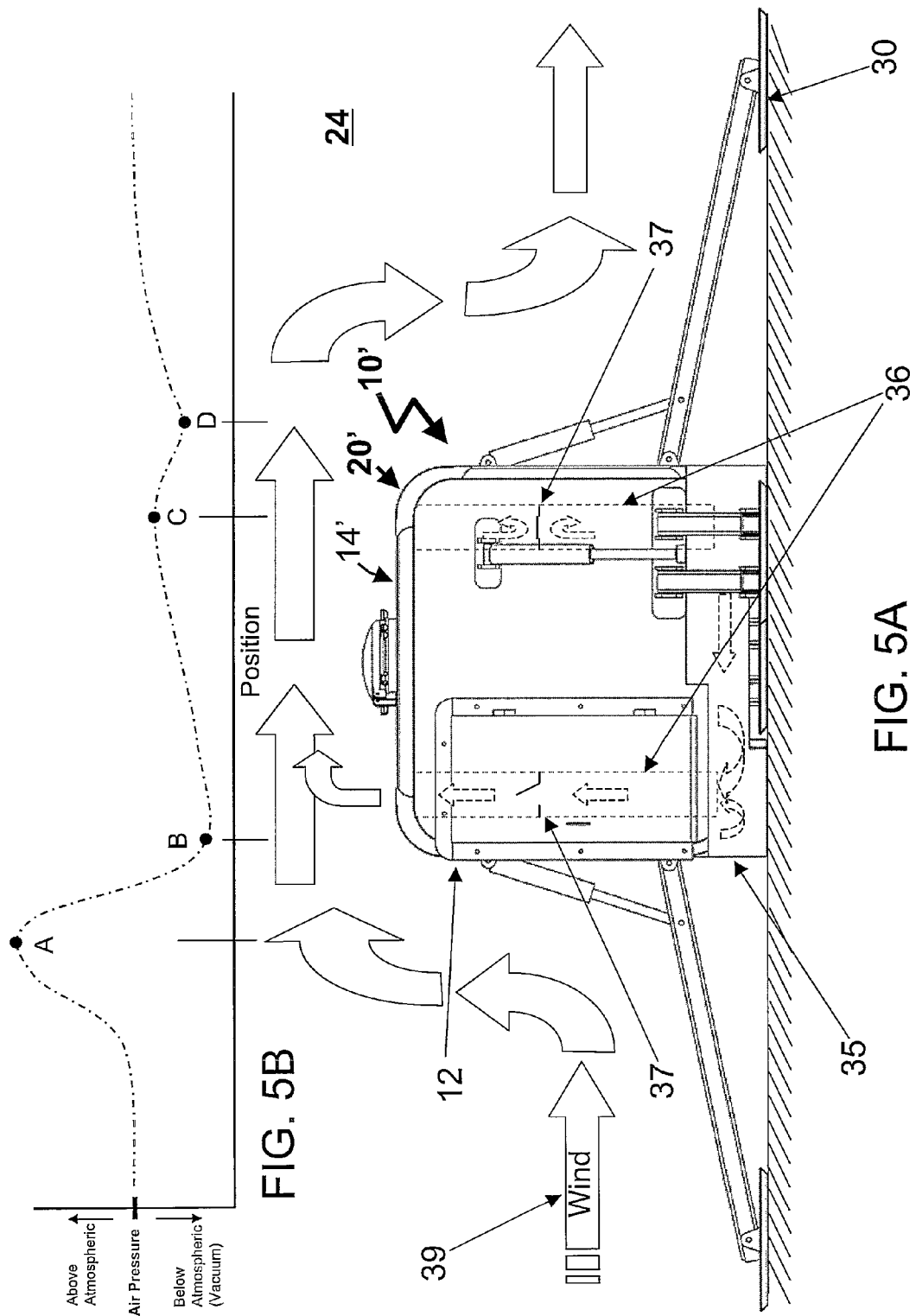

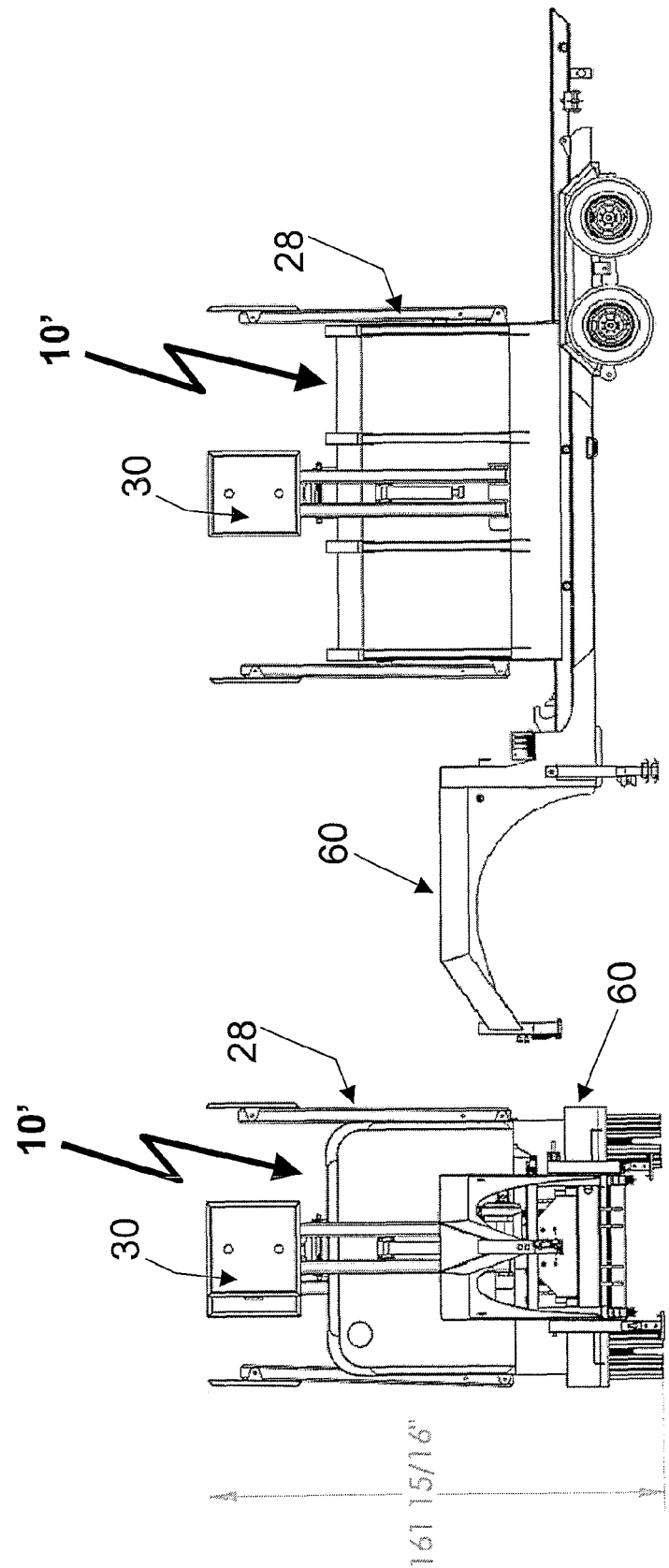

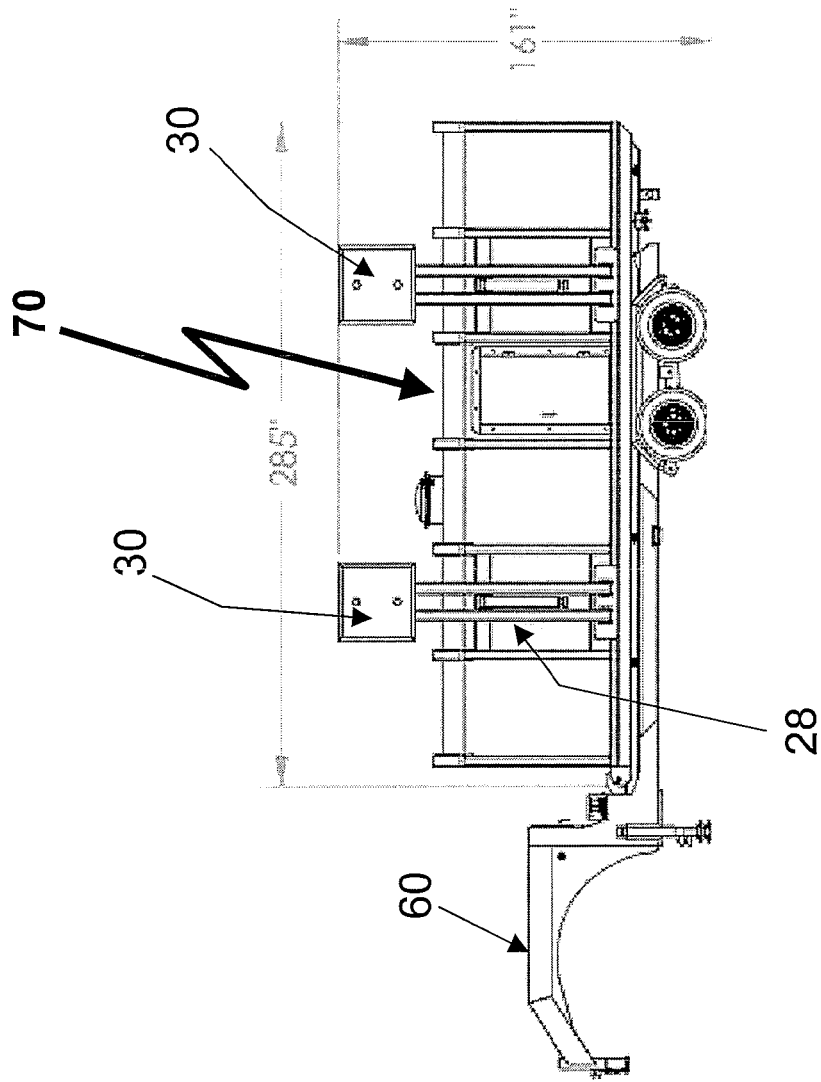
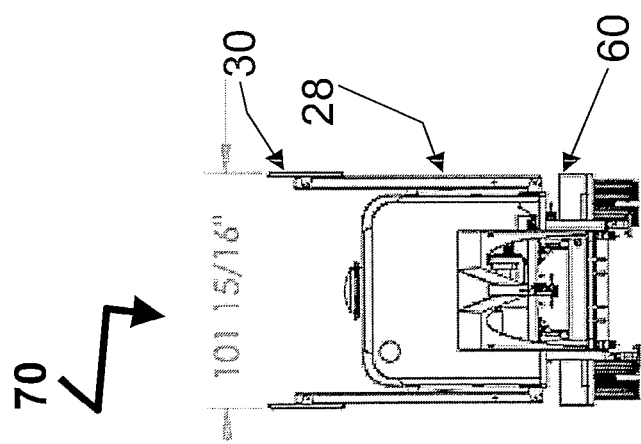
FIG. 8B
FIG. 8A

RE-DEPLOYABLE MOBILE ABOVE GROUND SHELTER

PRIORITY CLAIM AND CROSS-REFERENCE

The present application claims priority to U.S. Non-Provisional patent application Ser. No. 12/579,004 and U.S. Provisional Patent Applications 61/105,245 and 61/106,416, which are incorporated herein by reference in their entireties.

BACKGROUND OF THE INVENTION

1. Technical Field

The present invention relates generally to protective shelters, and more particularly to redeployable mobile aboveground shelters using ducting (with and/or without unidirectional check valving) and/or retractable stabilizers to resist movement during high velocity wind events.

2. Description of the Related Art

The construction of storm shelters, safe rooms and blast resistant modules is well known and thoroughly documented, for example, in FEMA 320, Third Edition and FEMA 361, Second Edition, both available from the Federal Emergency Management Agency (FEMA), as well as in ICC/NSSA 2008 "Standard for the Design and Construction of Storm Shelters," published jointly by the International Code Council (ICC) and the National Storm Shelter Association (NSSA) and in Section 6, Wind Loads, of "Minimum Design Loads for Buildings and Other Structures," SEI/ASCE 7-05, 2005, ISBN: 0-7844-0809-2, published by the American Society of Civil Engineers. To meet safety standards, conventional shelters require either burial below ground or, for aboveground shelters, secure fastening of the shelter by numerous metal bolts or adhesives to heavy foundations or concrete "pads". For aboveground shelters, the combined weight of the shelter plus its foundation or "pad" is the primary factor relied upon to resist movement of the shelter (and thus provide protection of its occupants) during high velocity wind events. In virtually all instances non-residential aboveground shelters are designed to be permanently installed at one location.

The unavailability of redeployable or mobile protective shelters leaves at risk personnel that are temporarily located where severe wind events may occur. Those working on oil well drilling rigs, pipeline construction, wind turbine erection, petroleum refineries, compressor station repair, and road construction and repair are examples of personnel at risk. One of the challenges of providing severe wind event protection for such personnel is the need for the shelter to be able to be easily, quickly and inexpensively relocated to different work sites as the crews frequently relocate.

Conventional above ground protective shelters depend almost completely upon the total weight of the shelter and its attached concrete foundation to resist movement. To a lesser degree, the large width of the required concrete foundation also helps the assembly resist overturning. To resist wind induced overturning, uplift and sliding, some shelters require the use of expensive subterranean concrete footings in addition to the wide width and massive weight of the foundational pads. Although pre-cast concrete community and industrial shelters are available, their immense weight (approximately 75,000 lbs. or more) requires the use of specially permitted and oversized trucks to haul them and heavy cranes to lift them into place, which renders their temporary redeployment impractical. Some conventional metal shelters can be unbolted from their heavy concrete bases and moved more easily. However, each new location requires the preparation of another heavy concrete pad to which the shelter can be bolted. In most instances the cost and inconvenience of pouring of a new pad (and the attendant environmental impact of their subsequent demolition and removal) renders impracticable the redeployment of a metal protective shelter for temporary use.

SUMMARY OF THE INVENTION

Work crews temporarily operating in remote areas can be subject to dangers such as tornados, hurricanes and explosive blast waves. A re-deployable mobile aboveground protective shelter suitable for use in such environments utilizes retractable stabilizing arms and/or structures equipped with ducting (with or without valving) that leverage aerodynamic forces and/or air pressure differential to resist uplift, overturning and sliding. Because the protective shelter does not rely exclusively upon excessive weight to counter wind forces, the protective shelter can be quickly, easily and inexpensively redeployed to new sites.

BRIEF DESCRIPTION OF THE DRAWINGS

FIG. 4A is a side elevation view of the long sidewall of the protective shelter of FIG. 2 illustrating the operation of the air ducts and valves during a high velocity wind event;

FIG. 4B is a Cartesian graph of static air pressures versus position along the long sidewall of the protective shelter of FIG. 4A during a high velocity wind event;

FIG. 5A is a side elevation view of the short sidewall of the protective shelter of FIG. 2 illustrating the operation of the air ducts and valves during a high velocity wind event;

FIG. 5B is a Cartesian graph of static air pressures versus position along the short sidewall of the protective shelter of FIG. 5A during a high velocity wind event;

FIGS. 6A-6B respectively depict end and side elevation views of an assembly comprising the protective shelter of FIG. 2 loaded on a roll-off transport;

FIGS. 8A-8B respectively depict end and side elevation views of an assembly comprising the protective shelter of FIGS. 7A-7D loaded on a roll-off transport;

DETAILED DESCRIPTION OF ILLUSTRATIVE EMBODIMENT

In various embodiments, an aboveground protective shelter can utilize an air ducting system and/or retractable stabilizers to resist movement of the shelter during a high wind event, such as a tornado, hurricane or explosion blast. If present, the air ducting system utilizes the reduced air pressure (as described by Bernoulli's principle) that forms in regions above the shelter roof and/or on the shelter sidewall(s) and/or on the leeward shelter wall during a high-velocity wind event to evacuate a substantially enclosed space beneath the shelter floor, reducing the air pressure in the enclosed space to below that of the surrounding atmospheric pressure and offsetting the aerodynamic lift produced by the wind accelerating over the shelter roof and around the side walls. The greater the wind velocity over and around the shelter (whether naturally occurring or augmented by some structure), the greater the holding force created in the enclosed space beneath the shelter, with the holding force in some embodiments always exceeding the lift. The retractable stabilizers, if present and deployed, increase the effective length and/or width of the protective shelter, increasing the moment arms acting to resist overturning forces produced by a high velocity wind event (e.g., 250 miles per hour or more). In the same or additional embodiments, increasing the length and/or width of the enclosed space beneath the shelter (i.e., the "basement") relative to the shelter safety cabin floor area proportionately increases the holding force relative to the uplift forces during a high-velocity wind event. Although the vacuum alone is in many embodiments sufficient to hold the shelter against wind forces, the stabilizers can be utilized to provide redundancy and added safety margin, as can helical or other style earth anchors properly placed.

Figure 1A:
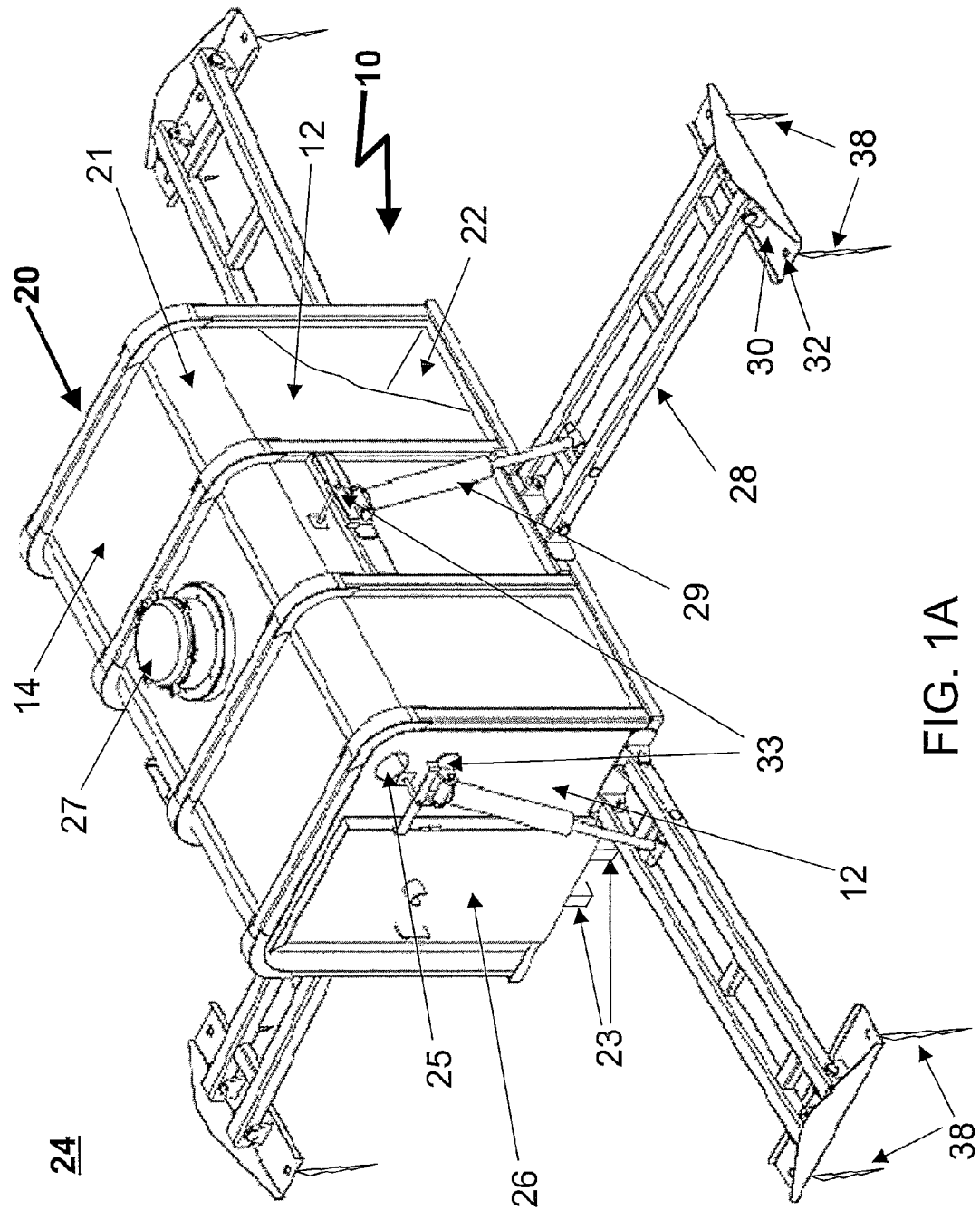
FIG. 1A is a perspective view of an entry end of a first embodiment of a protective shelter as seen from above.

With reference now to FIG. 1A, there is illustrated a perspective view of the entry end of a first embodiment of a protective shelter 10 as seen from above. In an exemplary implementation, protective shelter 10 includes an enclosure 20 constructed of formed and/or welded, reinforced steel (or steel alloy) plate of sufficient strength to protect occupants and contents of protective shelter 10 from high-velocity wind events, impact and penetration by wind borne debris. In the depicted embodiment, enclosure 20 has a generally rectangular prismatic shape having a floor 22, four sidewalls 12, and a roof 14 all formed of reinforced steel plate.

For example, enclosure 20 can be made of welded A36, ¼" steel plate with reinforcing ribs of sufficient size, placement and design to meet or exceed deflection and penetration limits established by the National Storm Shelter Association (NSSA) standard, the Federal Emergency Management Agency (FEMA) standards, the American Society of Civil Engineers (ASCE) standards and/or the ICC/NSSA 500 standard. Lesser or greater material thicknesses, types, and strengths can alternatively be used.

Figure 1B:
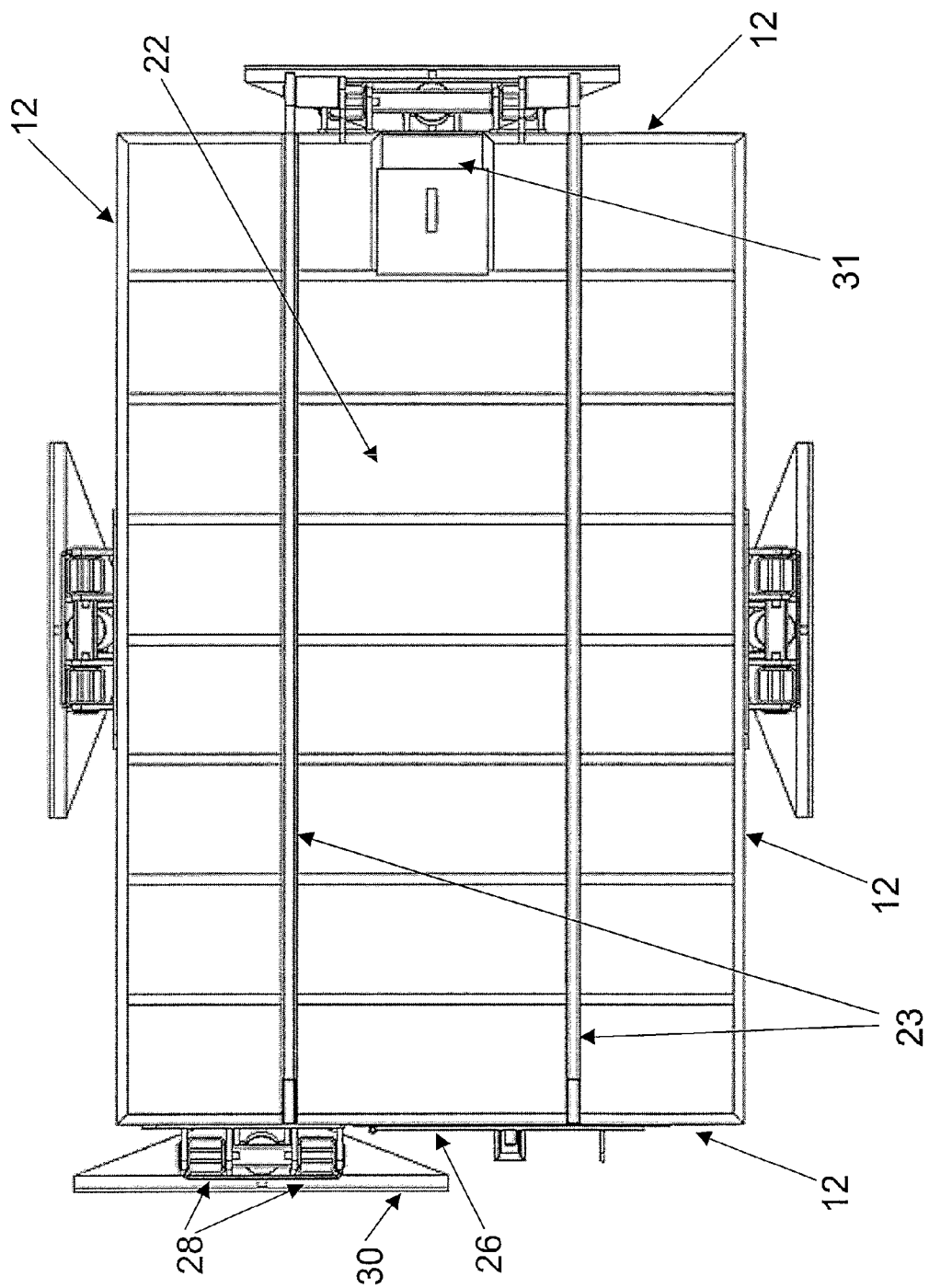
FIG. 1B is a bottom plan view of the protective shelter of FIG. 1A.
Figure 1C:
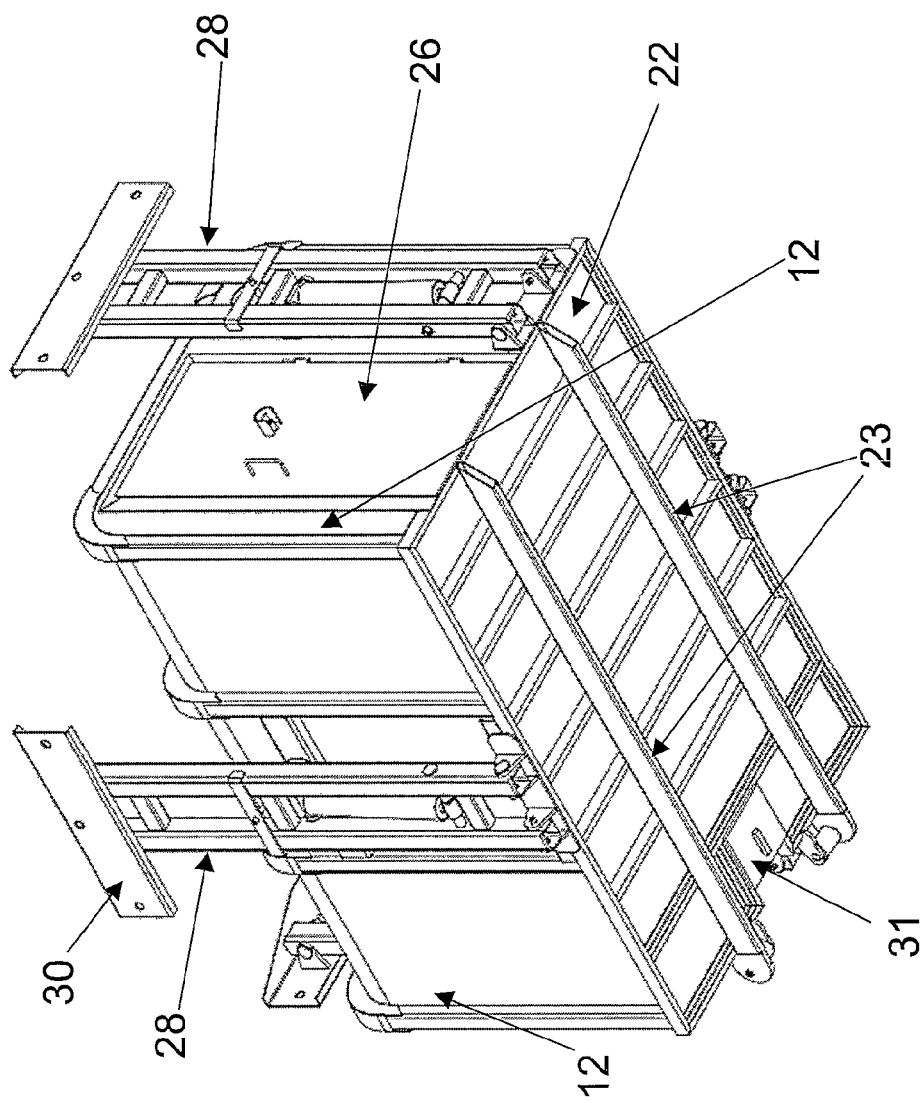
FIG. 1C is a perspective view of an entry end of the protective shelter of FIG. 1A with its stabilizers retracted, as seen from below.
Figure 1D:
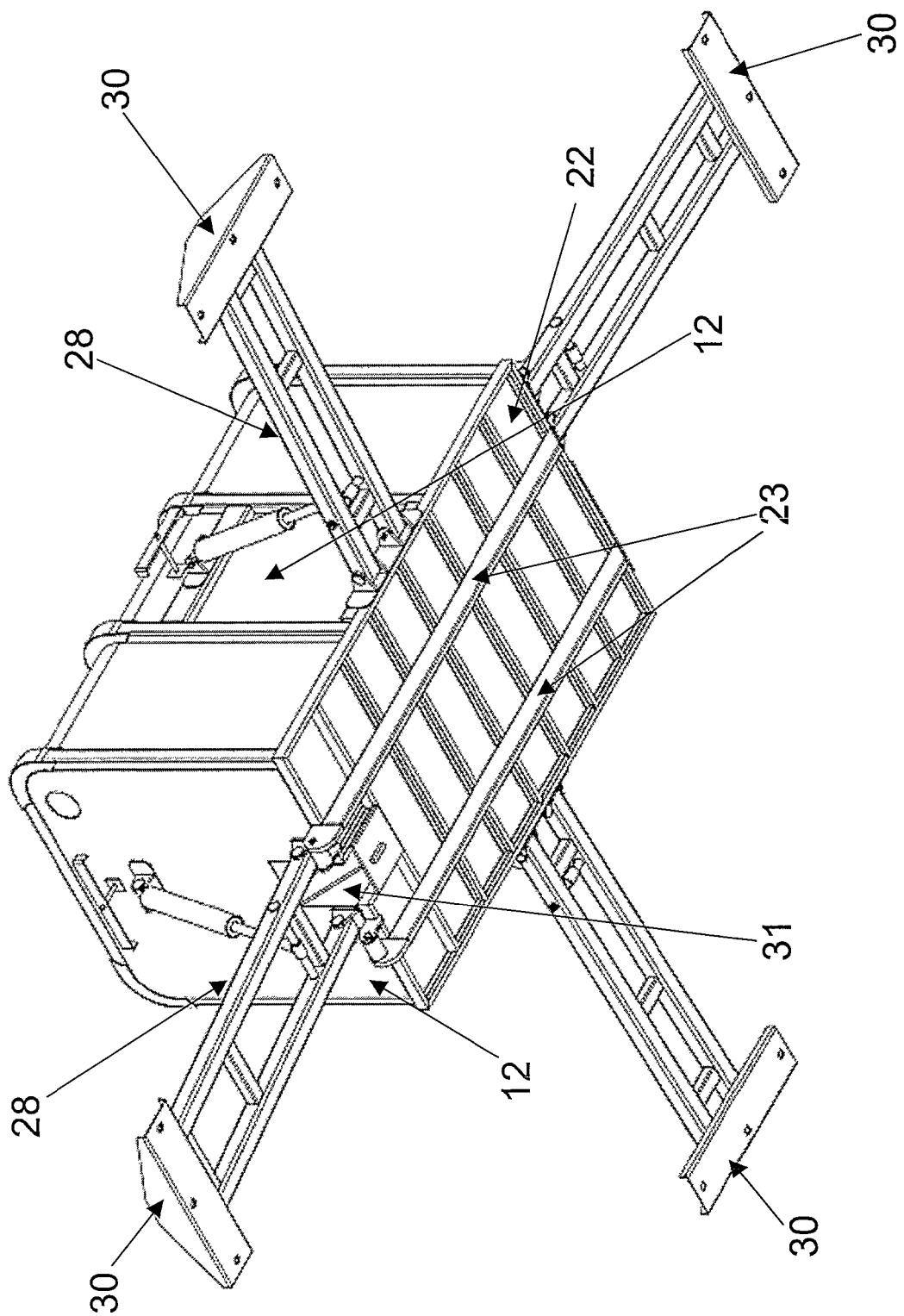
FIG. 1D is a perspective view of a back end of the protective shelter of FIG. 1A with its stabilizers extended, as seen from below.

In a preferred embodiment, floor 22 of enclosure 20 is supported by one or more supports above the underlying substrate (e.g., ground, pavement, rig platform, etc.) when protective shelter 10 is deployed in environment 24. For example, in the illustrated embodiment, floor 22 is welded to and rests upon one or more (e.g., two) undercarriage rails 23 (as illustrated in FIGS. 1B-1D) that elevate floor 22 above the substrate. In at least some embodiments, undercarriage rails 23 conform to the standard design for roll-off containers, thus allowing the shelter to be loaded and unloaded from a conventional roll-off transport truck or trailer. For example, according to one conventional standard, protective shelter 10 has two parallel undercarriage rails 23 formed of 2"×6"×¼" (or ⅜") steel plate that are symmetrically disposed about a central axis of floor 22 and that are spaced by 36½". The undercarriage rails are preferably configured (e.g., with openings or spacers placed between the rails 23 and the shelter floor 20) so as to not inhibit but to allow the free passage of air from any locale beneath the shelter to any other locale.

Sidewalls 12 are preferably welded to floor 22 to form a substantially air-tight connection. One or more security doors 26 (see, e.g., FIGS. 1A and 1C) are provided in one or more of sidewalls 12 to permit ingress and egress into and out of the interior volume of enclosure 20 and, upon being securely closed, to isolate personnel and articles within enclosure 20 from external threats. Sidewalls 12 may be further provided with shielded ventilation and pressure relief openings 25 (e.g., in each of a pair of opposing sidewalls 12) of sufficient size to provide sufficient breathing air for the rated number of shelter occupants and pressure relief of the internal space in accordance with the ICC/NSSA 500 standard. It is preferable if at least one sidewall 12 has formed therein a cavity 31 housing a standardized cable connection for attaching the loading winch of a roll-off transport truck or trailer.

In the depicted embodiment, roof 14, which is welded to each of sidewalls 12, has a curved roof portion 21 along the upper edges of one or more walls 12 (e.g., the two walls 12 having the greater length). Roof 14 may also have at least one escape hatch 27 to permit egress from enclosure 20 in the event security door 26 becomes inoperable or otherwise blocked.

Still referring to FIG. 1A and additionally to FIGS. 1B, 1C and 1D, protective shelter 10 may optionally further be equipped with one or more extendable and retractable stabilizers (outriggers) 28, that when extended from enclosure 20 (as shown in FIGS. 1A and 1D) increase the effective width and/or length (and hence moment of inertia) of protective shelter 10. In the depicted embodiment, stabilizers 28 are lowered from the retracted position shown in FIGS. 1B-1C to the extended position shown in FIGS. 1A and 1D and raised from the extended position to the retracted position by internally self locking or the more simple standard hydraulic actuators 29. In alternative embodiment, stabilizers 28 can be operated by pneumatic, electrical, mechanical or manual actuators used individually or in combination to raise, lower, test and lock into place all stabilizers during initial deployment of the unit and its subsequent loading for transport and/or redeployment. When stabilizers 28 are in the refracted position, as shown in FIGS. 6A-6B, retaining pins 33 may be utilized to secure stabilizers 28, for example, to facilitate transport of protective shelter 10. Exemplary dimensions for stabilizers 28 are given in FIG. 3.

Stabilizers 28 may be tipped with force-spreading feet 30 optionally having openings 32 therein to permit installation of optional anchors 38. In some embodiments, anchors 38 need only be of such size and material as to withstand the shear forces of the wind against the windward and leeward sidewalls 12. Anchors 38 can include and be implemented, for example, with commercially available helical earth anchors or earth screws or even simple metal rods with caps or heads sized to prevent being pulled through openings 32. As will be appreciated, the use and holding strength required of anchors 38 to resist sliding and overturning of protective shelter 10 will vary between embodiments and between installation conditions. Thus, for heavier embodiments (e.g., 20,000 lbs.) or for dense compacted clay soils, shorter anchors 38 exhibiting less holding strength can be employed. For lighter embodiments (e.g., 12,000 lbs.) or for sandy or loamy soils, longer anchors 38 exhibiting greater holding strength are preferably employed.

Stabilizers 28 can be used to field prove the holding strength of the protective shelter 10 and therefore verify that a particular installation of protective shelter 10 can withstand the design wind speed. As an initial step, accurate calculations of the overturning and uplift forces produced on protective shelter 10 by a wind of the rated speed (e.g., 250 mph) are made, for example, utilizing the Wind Loads on Structures software commercially available from Standards Design Group, Inc. (SDG) of Lubbock, Tex. Hydraulic actuators 29 can then be used to attempt to pull out the anchors 38. If, during this process, the hydraulic pressure reaches a predetermined level (determined, for example, by the hydraulic cylinder diameter, length of stabilizer 28, and the weight of protective shelter 10) corresponding to the force exerted on protective shelter 10 by a wind of rated speed (or exceeds that force by some desirable safety factor) without withdrawing compromising the anchor(s) 38, then the installation of protective shelter 10 is guaranteed to withstand a wind of rated speed.

Figure 9:
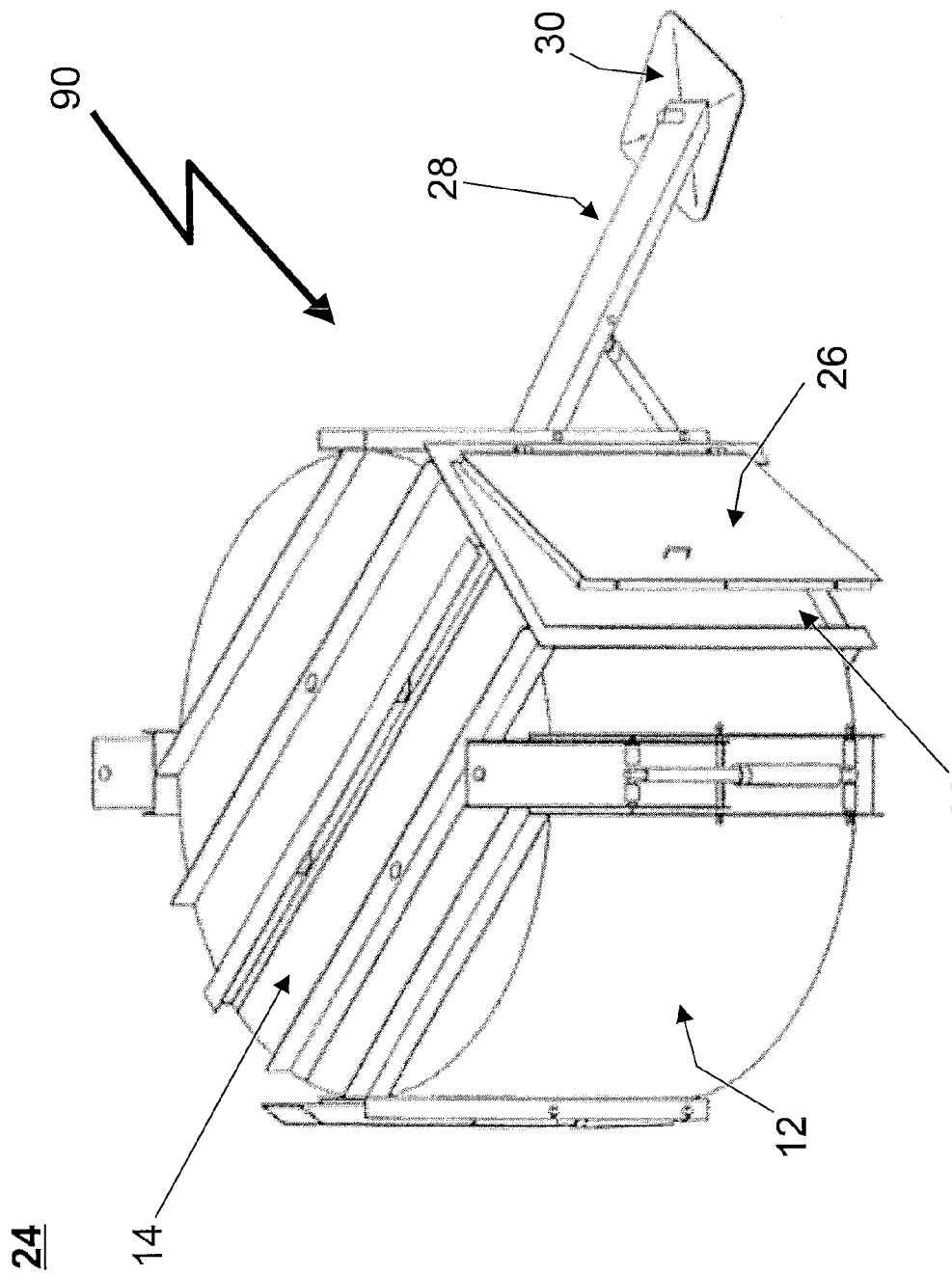
FIG. 9 is a perspective view of a fourth embodiment of a protective shelter.
Figure 13:
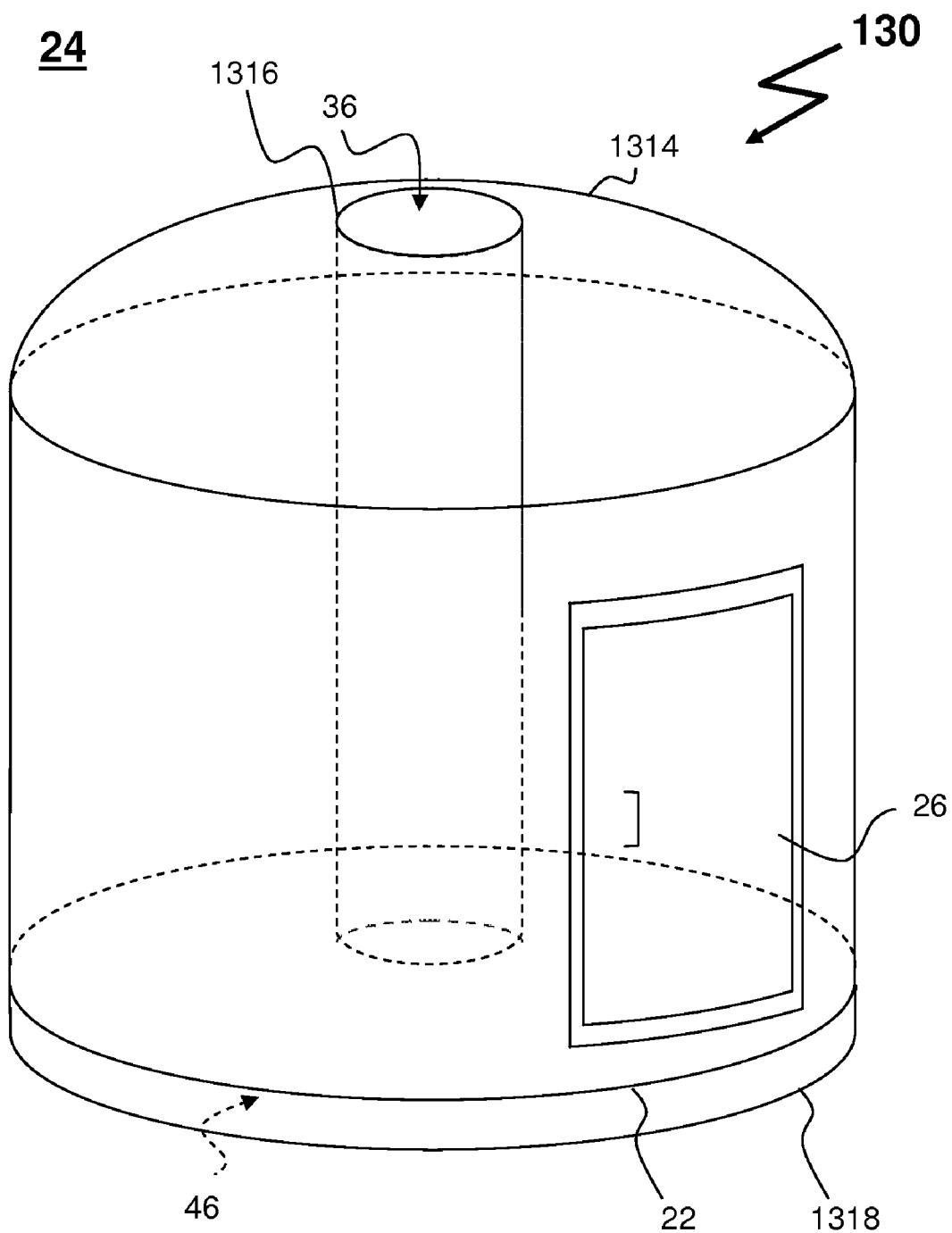
FIG. 13 illustrates a perspective view of a sixth embodiment of a protective shelter.
Figure 14:
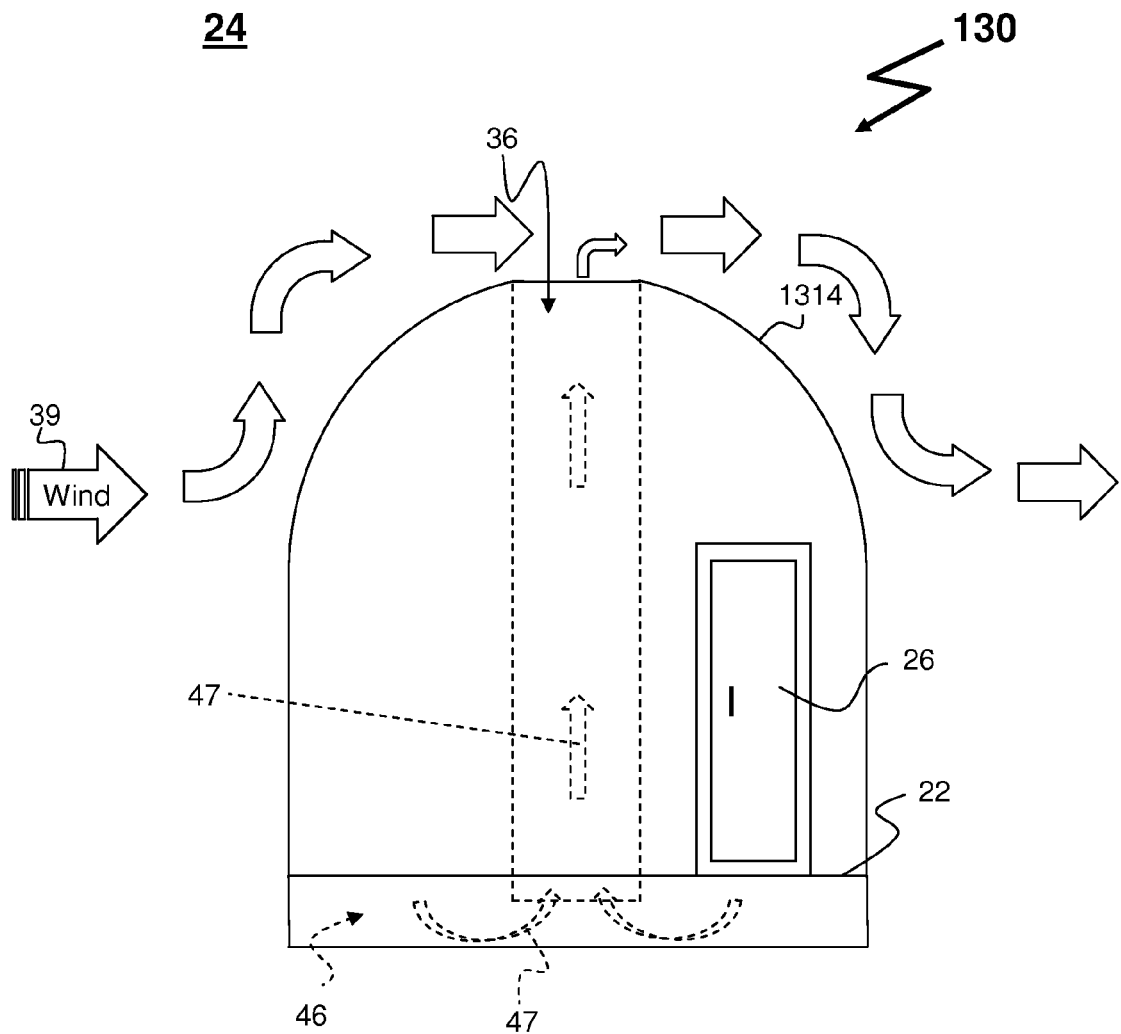
FIG. 14 is an elevation view of the protective shelter of FIG. 13 illustrating the operation of the air duct during a high velocity wind event.

Although virtually any shape of enclosure 20 can be employed, the presently preferred shapes and sizes fall within state and federal Department of Transportation (DOT) height, width, length and weight limits for non-permitted loads on public roadways. For example, one preferred shape is a rectangular prism that, due to its geometry, affords maximum refuge space for occupants, and that, when loaded on its transport device, has a height, width, length and weight that do not exceed DOT limits. Alternatively, a vertical cylindrical shape (with any shape or style of roof) can be employed; however, the floor area (and hence occupancy rating) for a cylindrical design is less than that of a rectangular prism having a minimum sidewall length at least equal to the diameter of the cylinder. An exemplary protective shelter 90 including a cylindrical enclosure with a substantially flat roof 14 is depicted in FIG. 9. Another exemplary protective shelter 130 including a cylindrical enclosure with a substantially domed roof 1314 is depicted in FIGS. 13 and 14.

The height of enclosure 20 can also vary between embodiments, with shorter heights generally being preferred because the overturning force on the windward wall varies with the square of the height if all other factors remain constant. A typical height of enclosure 20 is between 72 and 96 inches. Although a cylindrical shelter has the disadvantage of less available floor area within DOT permissible limits, a cylindrical shelter has a significantly lower drag coefficient than a flat-walled shelter, resulting in proportionately lower sliding and overturning forces being induced by a given wind speed (e.g., 250 mph).

It should be understood that virtually any shape and style of roof (e.g., flat, domed, round, parapet, hip, gable, mansard, etc.) can be utilized in the various embodiments of the disclosed protective shelter. However, a roof having inwardly sloping or convexly curved outer edges on at least two sides and a flat central portion is one of a number of preferred embodiments. Such a design is one preferred embodiment because the net uplift created by wind passing over enclosure 20 having such a roof design is generally less than those having alternative roof designs. Furthermore, such a roof design creates a region of low pressure concentrated along the beginning of flat portion of the windward roof edge. In other preferred embodiments, a roof having inwardly sloping or convexly curved outer edges on at least two sides and a curved central portion creates a region of maximum low pressure concentrated at the apex of the curved/arched central portion along its longitudinal axis. As discussed further below, the low pressure can be beneficially redirected by a ducting system beneath the shelter floor to assist in resisting movement of protective shelter 10 by high velocity winds.

Figure 2:
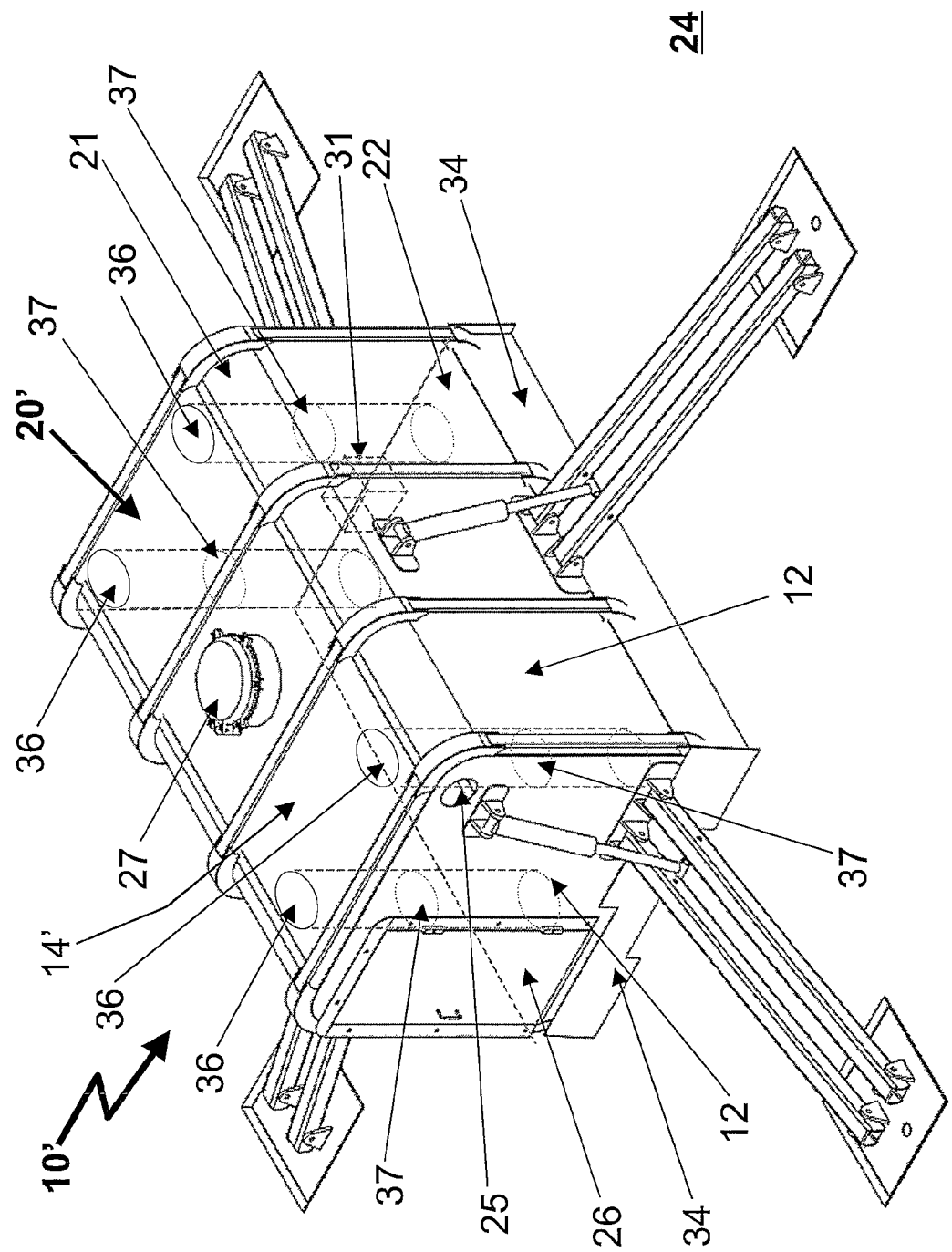
FIG. 2 is an entry end perspective view of a second embodiment of a protective shelter.
Figure 3:
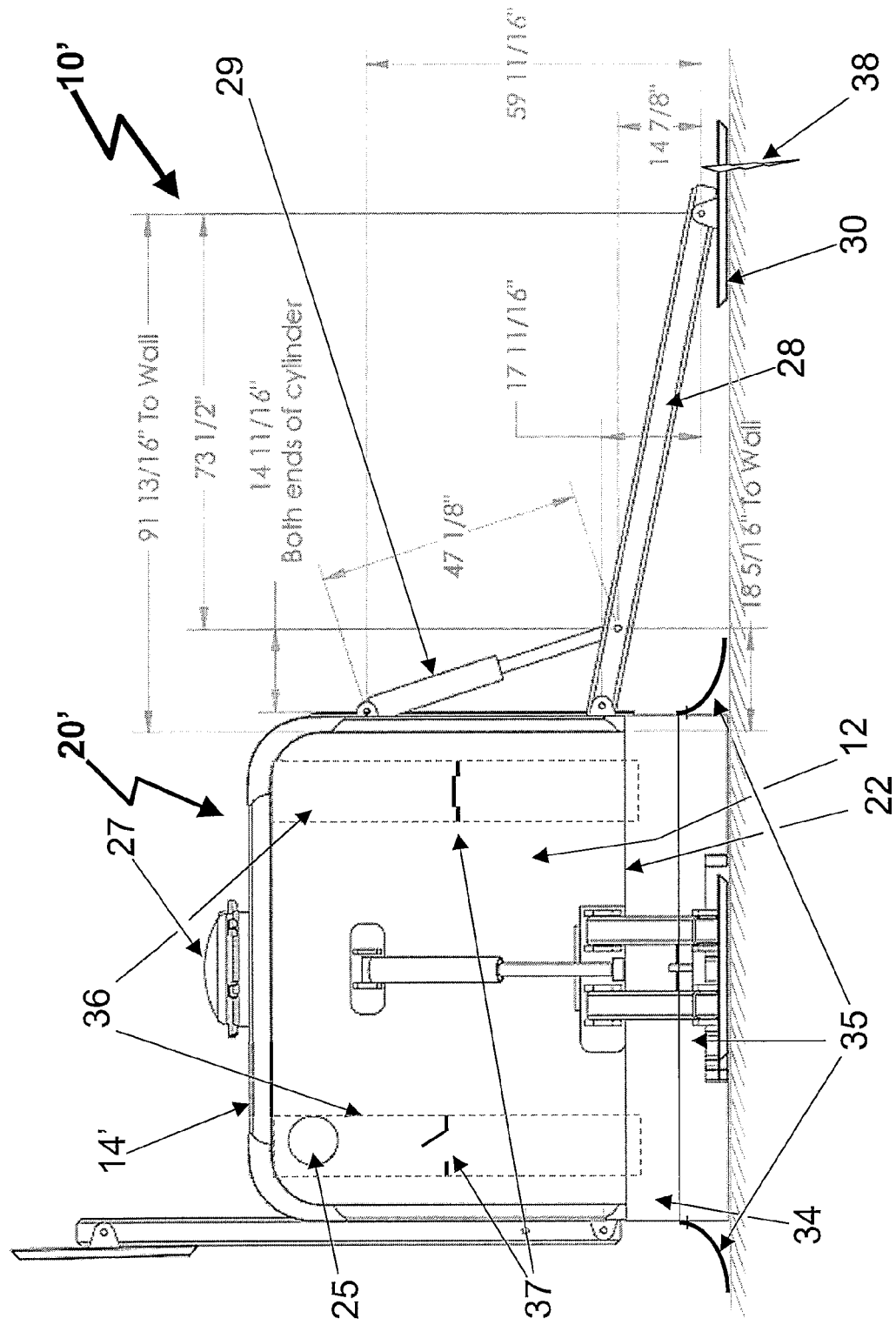
FIG. 3 is an end elevation view of the protective shelter of FIG. 2.
Figure 7A:
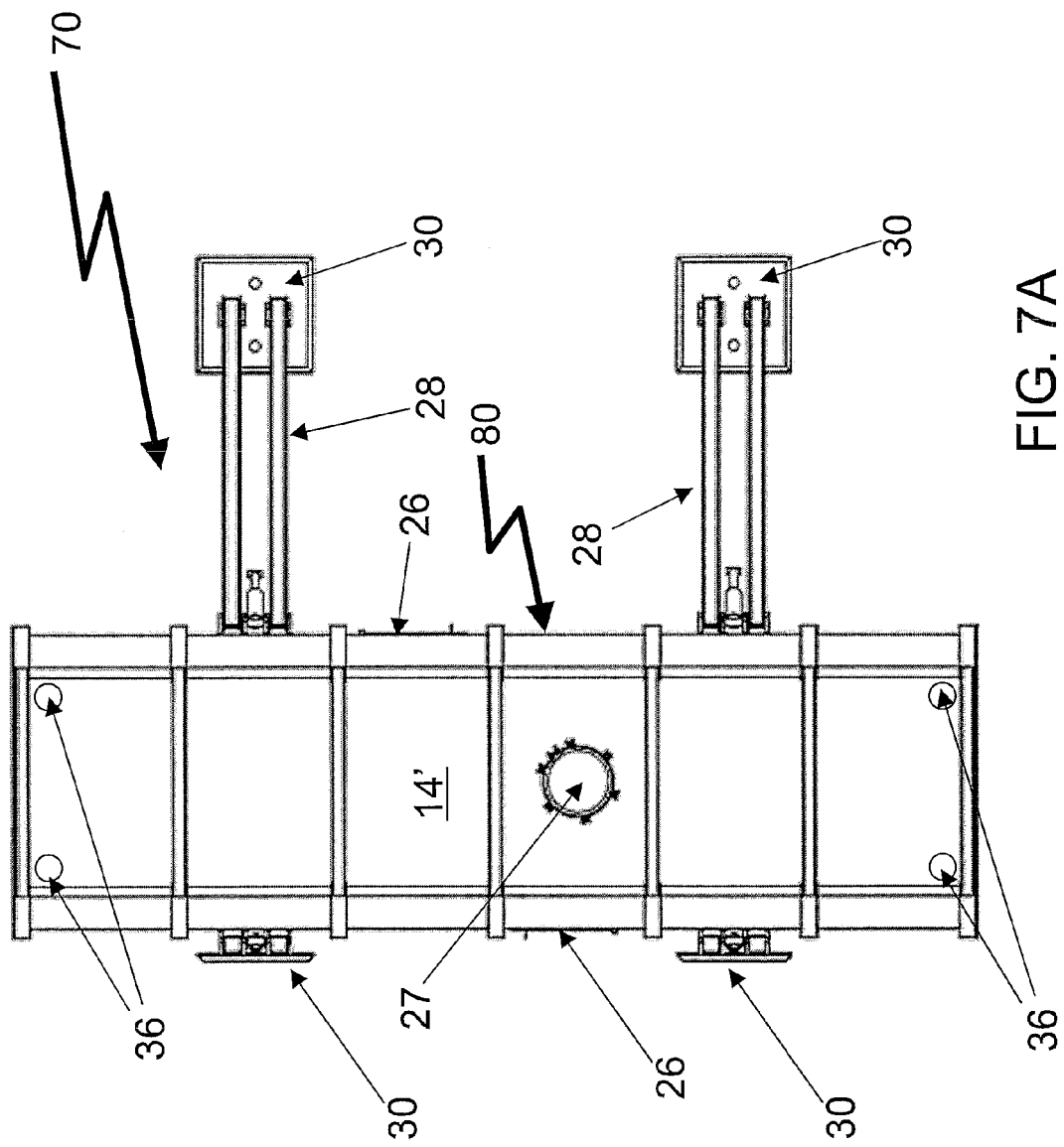
FIGS. 7A-7D respectively illustrate a top plan, short side elevation, perspective, and long side elevation views of a large capacity third embodiment of a protective shelter.
Figure 7B:
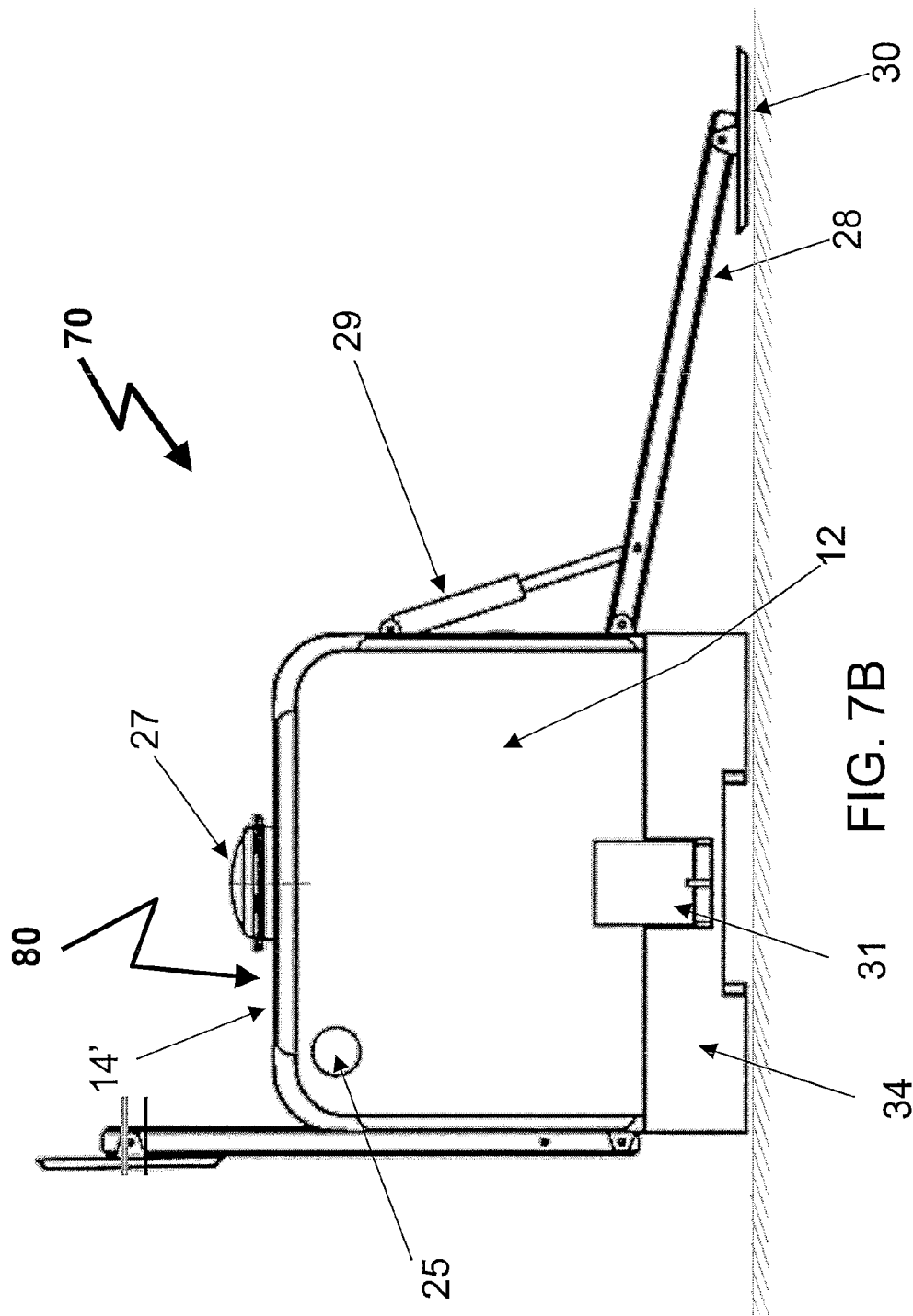
Figure 7C:
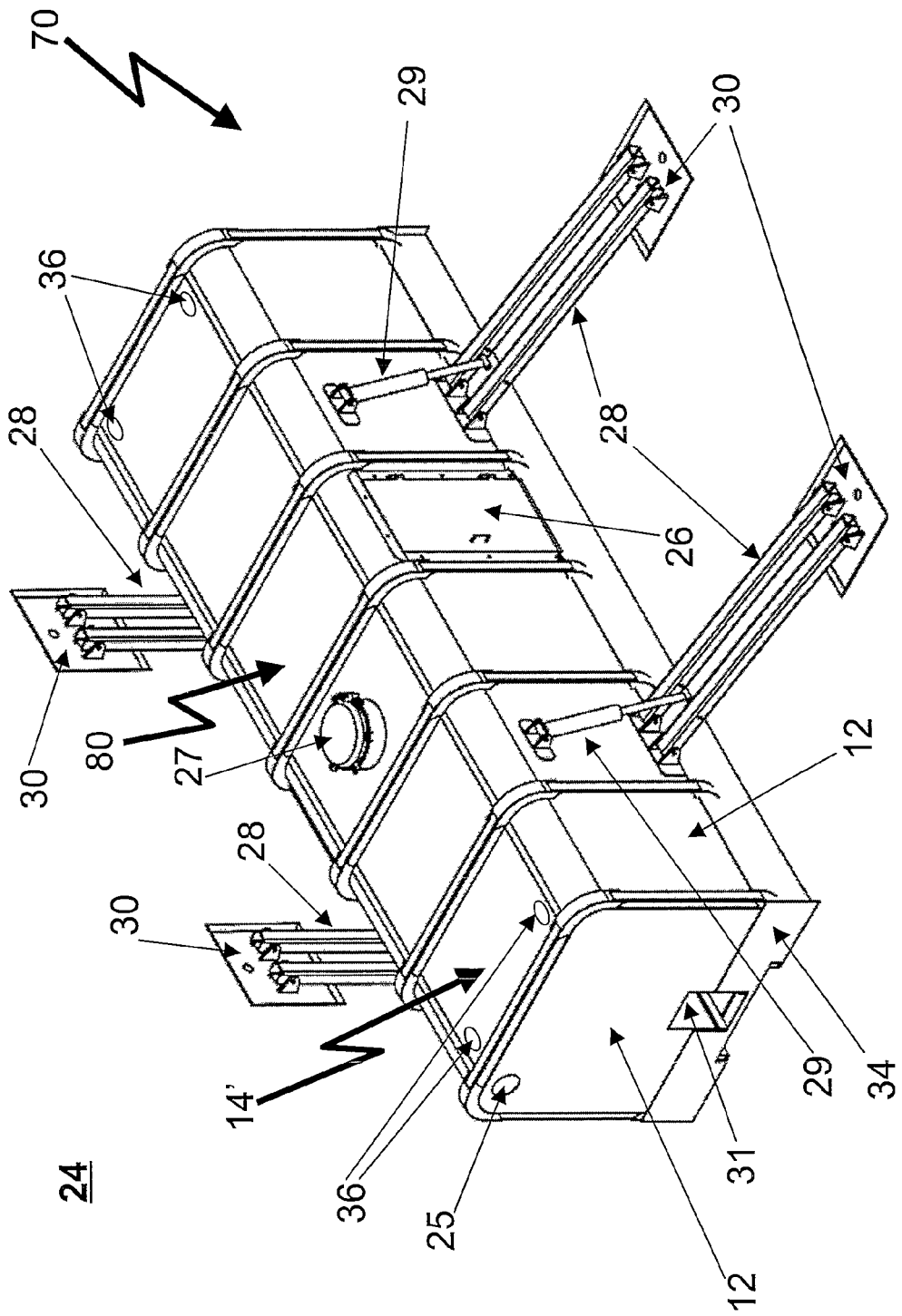
Figure 7D:
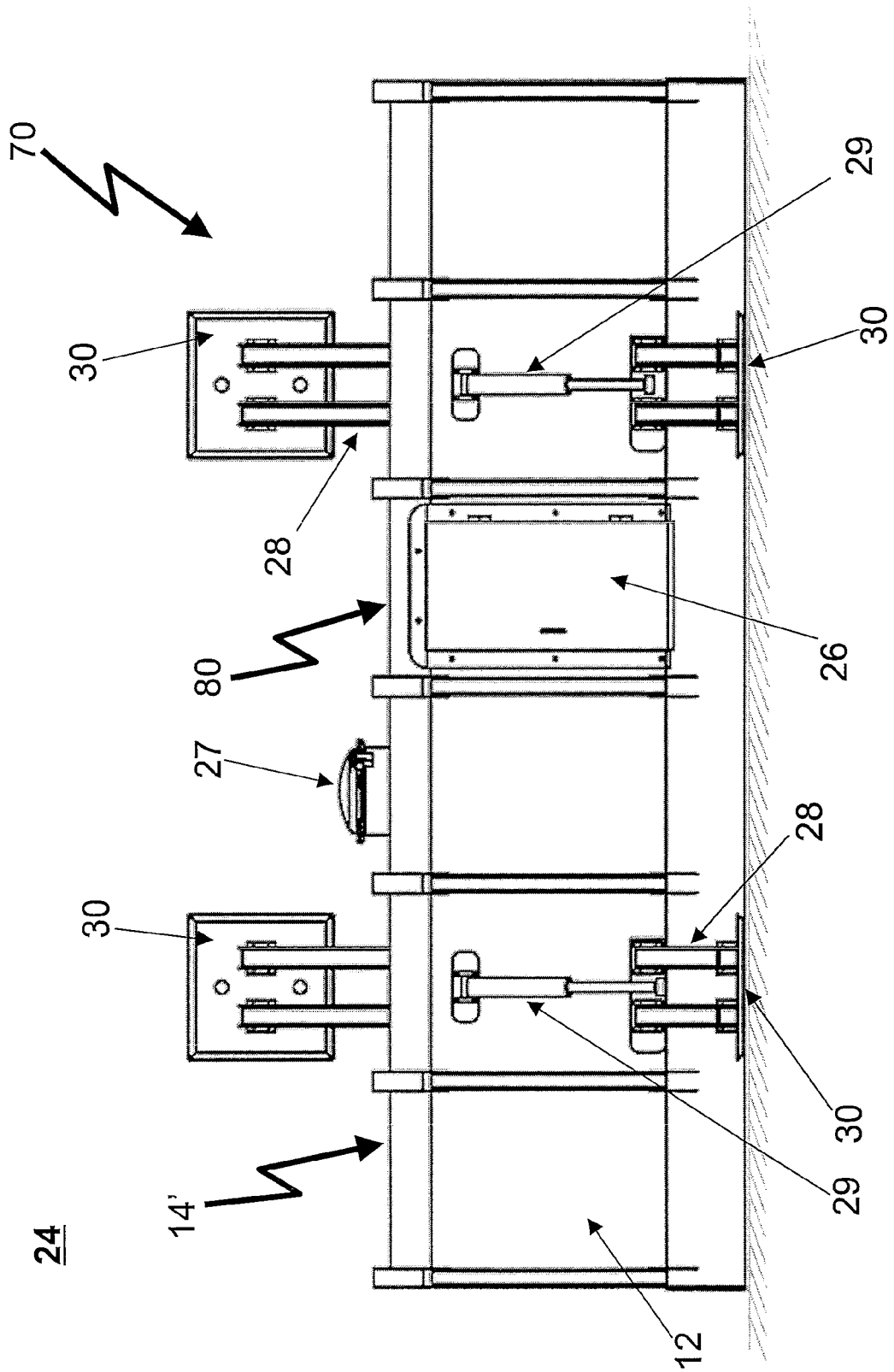

Referring now to FIGS. 2-3, perspective and elevation views of a second embodiment of a protective shelter 10' are depicted. As indicated by like reference numerals, the construction of protective shelter 10' is substantially the same as that of protective shelter 10 of FIG. 1. Accordingly, protective shelter 10' includes an enclosure 20' including a floor 22, four sidewalls 12 and a roof 14' all formed of welded plate steel. Protective shelter 10' may also optionally have stabilizers 28 as previously discussed. Unlike protective shelter 10, protective shelter 10' further includes rigid skirting 34 surrounding the base of sidewalls 12 to form a lower substantially enclosed sub-floor region (basement air space) below floor 22.

It will be appreciated that when a solid object of any shape, such as enclosure 20', is immersed in a flowing stream of fluid (e.g., a wind), areas of relatively lower and higher pressures are created over all the surfaces of that object according to Bernoulli's principle. These different pressures create static and dynamic forces that can influence the potential movement of the object.

The safety of protective shelter 10' is enhanced by leveraging the wind-induced air pressures to substantially offset the uplift and overturning forces created by high velocity wind passing over and around enclosure 20'. The wind-induced air pressures are leveraged by implementing a plurality of (in this embodiment, four) air ducts 36 that allow rapid air flow between the sub-floor region and the environment 24 above roof 14'. The upper ends of air ducts 36 can be either open or partially shielded to prevent penetration by debris.

Each air duct 36 houses a passively operated unidirectional check valve 37, the operation of which is biased by gravity (and can be enhanced with the aid of a spring) to a closed position and during a high-velocity wind event is opened by an air pressure differential between the substantially enclosed sub-floor region and the surrounding environment to permit only upward airflow. Thus, in the presence of a sufficient air pressure differential, an air duct 36 evacuates air from the substantially enclosed sub-floor region to the exterior of enclosure 20' above roof 14'. It should be noted that check valves 37 are illustrated approximately at midpoint of air ducts 36, but may alternatively be located at any position along air ducts 36 without negatively affecting the intended functioning. It should also be noted that there is a wide variety of check valve designs and constructions that will perform equally well.

Figure 11:
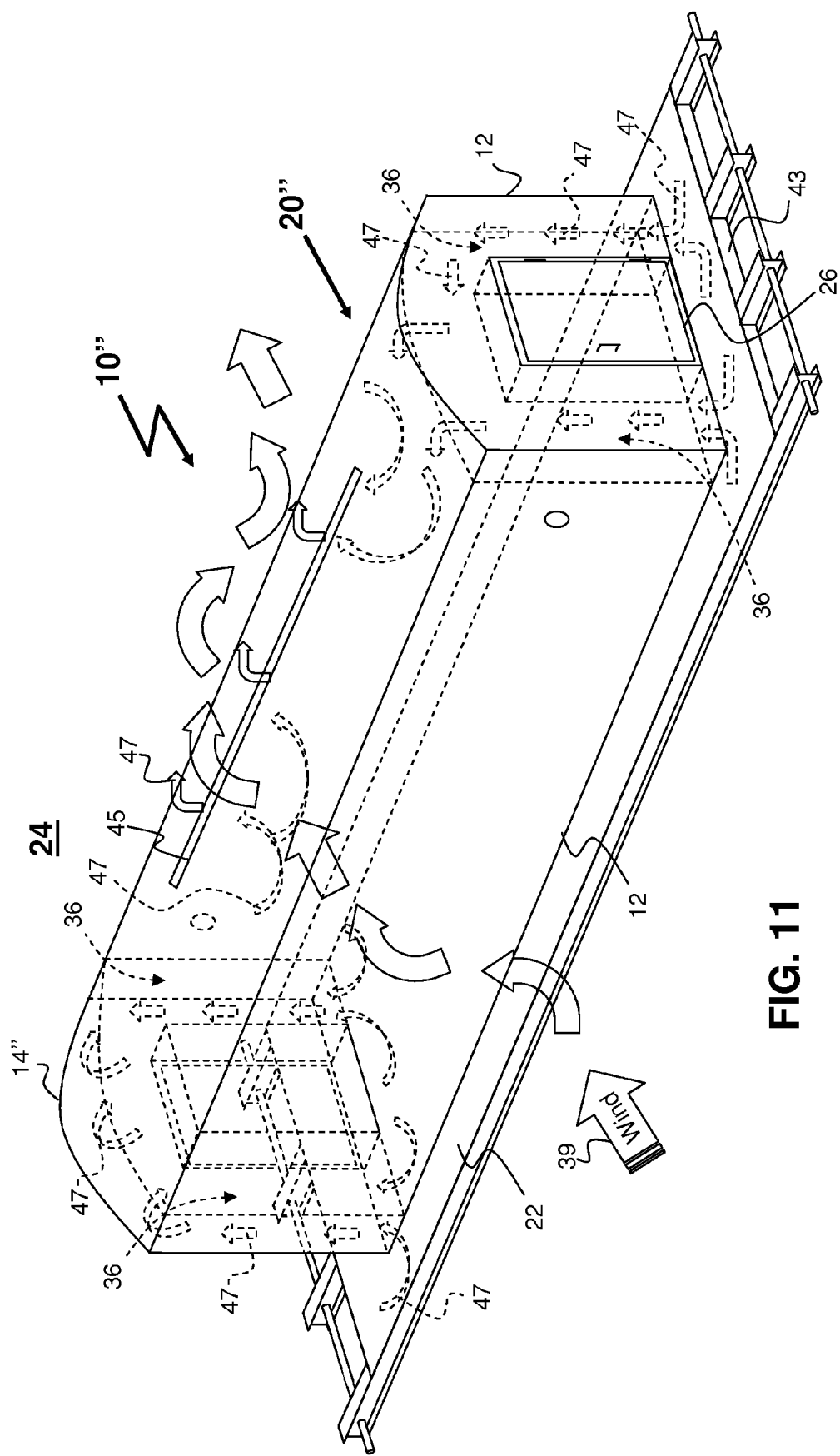
FIG. 11 is an entry-end perspective view of the protective shelter of FIGS. 10A-10D illustrating the operation of the air ducts during a high velocity wind event.
Figure 12:
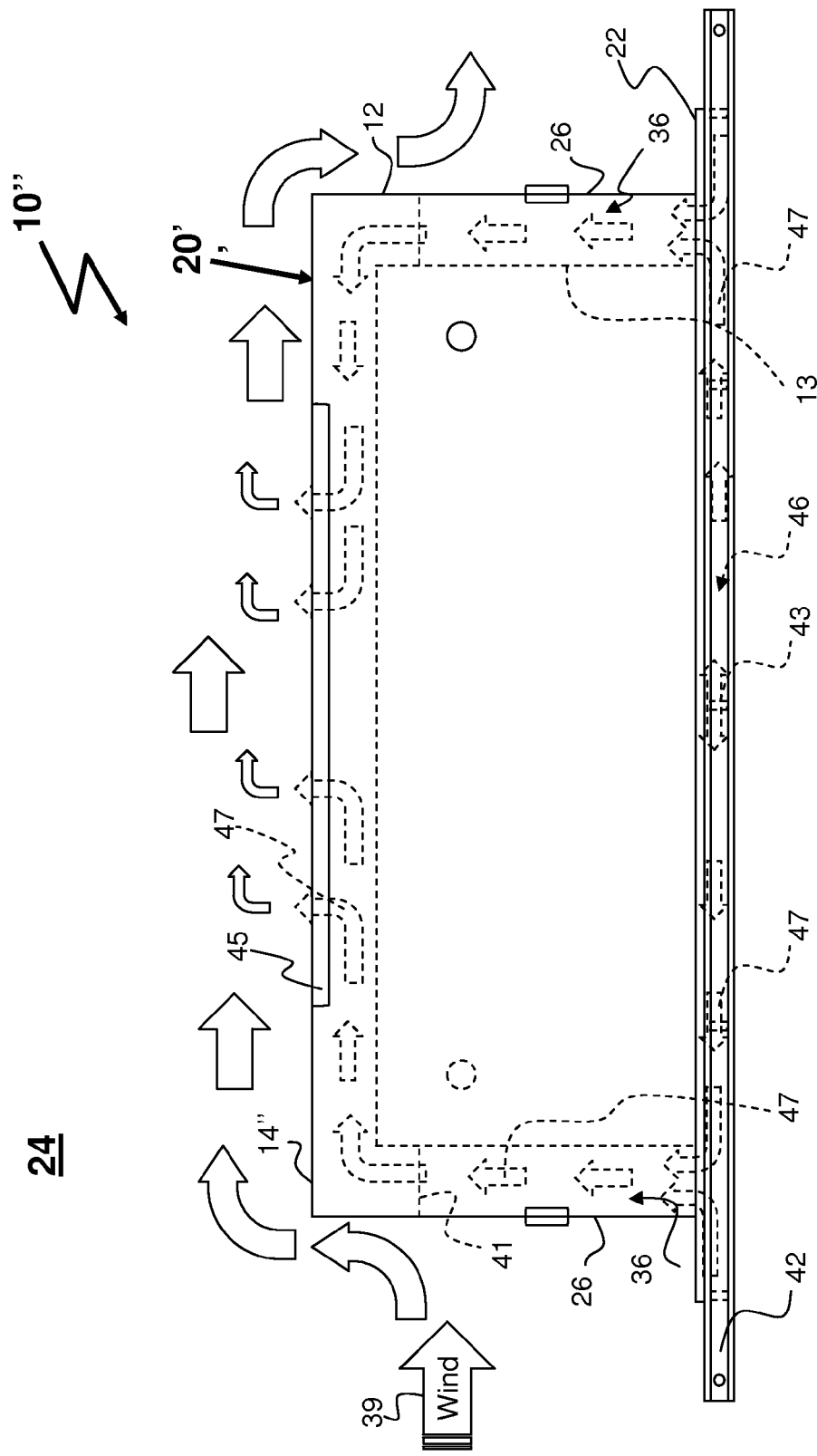
FIG. 12 is a side elevation view of the long sidewall of the protective shelter of FIGS. 10A-10D illustrating the operation of the air ducts during a high velocity wind event.

The size, number, shape and location of air ducts 36 can vary between embodiments. For example, other embodiments may include as few as one air duct 36 (as shown in FIGS. 13 and 14) or more than four. The geometry of air ducts 36 is also not critical. Air ducts 36 can have a circular cross-section (as shown in FIGS. 2-5A and 13-14) or any other cross-sectional shape (e.g., rectangular, as shown in FIGS. 11-12) providing sufficient cross-sectional area to permit rapid evacuation of the air beneath the enclosure 20'. It will also be appreciated that air ducts 36 can also be disposed external to the interior of enclosure 20' (e.g., incorporated into a sidewall 12 and/or reinforcing components thereof or be totally independent of the enclosure 20) to increase usable interior volume within enclosure 20'. Further, the upper openings of air ducts 36 may be located anywhere on or near the roof surface or even the side walls and leeward wall(s), but (for the illustrated roof design in FIGS. 1A-1D) are most beneficially located adjacent to each of the roof corners where the lowest pressure is generated by wind as it accelerates across roof 14'.

The disclosed air duct and valve arrangement passively and automatically selects the lowest air pressure created by the passage of wind over roof 14' of protective shelter 20' and utilizes the lowest available air pressure to evacuate air from the substantially enclosed sub-floor region, such that the air pressure in that substantially enclosed sub-floor air space is reduced to below the surrounding atmospheric pressure. Because the air duct and valve arrangement causes air to be continually withdrawn from the substantially enclosed sub-floor region of protective shelter 20' under high velocity wind conditions, the substantially enclosed sub-floor region acts as a "suction cup" to counter uplift, sliding and overturning forces exerted by high velocity winds and holds protective shelter 20' securely to the underlying substrate (e.g., ground). In at least some of the preferred embodiments, the holding force exerted by the low pressure in the substantially enclosed sub-floor region is always greater than the uplift force produced by the wind passing over roof 14' (i.e., the greater the wind velocity, the greater the holding force created beneath shelter 20'). This holding force significantly diminishes (and can in some instances completely obviate) the need for anchors 38 or other ground pinning to prevent enclosure 20' from lateral sliding and over turning under high wind conditions.

As best seen in FIG. 3, a semi-rigid or flexible sub-skirt 35, for example, of a rubber or reinforced propylene material, may optionally be additionally attached with bolts, plates and/or adhesives to the entire periphery of the lower edge of the rigid skirt 34. Although an EF-5 tornado with winds of 250 mph has been known to last several minutes, the typical duration of a deadly tornado is on the order of 10-30 seconds. Blast waves from explosions are of even shorter duration, on the order of less than a second. Sub-skirt 35, if present, provides greater conformance to the underlying substrate and serves to reduce the likelihood of pressure-induced "tunneling" under the rigid skirt 34 if protective shelter 10' is placed on an uneven substrate or loose soil subject to wind erosion during a short duration wind event. By conforming to the underlying substrate, sub-skirt 35 can assist in maintaining a vacuum in the substantially enclosed sub-floor region for the greatest time period, as discussed further below with reference to FIGS. 4A-4B. It should further be appreciated that the sub-skirt 35 can be formed of rigid metal plate and hinged from the lower periphery of rigid skirting 34 to permit deployment into contact with the substrate.

Referring now to FIG. 4A, there is depicted an elevation view of the long sidewall 12 of protective shelter 10' schematically illustrating the location and functioning of check valves 37 and air ducts 36 during a severe wind event. FIG. 4B is a Cartesian graph of the static air pressures at various locations relative to protective shelter 10' during the severe, high-velocity wind event (assumed to be a 250 mph wind).

As shown, wind 39 impacts a windward sidewall 12 of enclosure 20' and diverts over roof 14' and around the sides parallel to the wind direction. As shown in FIG. 4B at point A, the wind produces a positive pressure at the windward sidewall 12 of the enclosure 20' significantly above atmospheric pressure (e.g., on the order of +68 psf). As wind 39 is diverted upward to pass over enclosure 20', wind 39 accelerates, and the static pressure drops until reaching its lowest value at point B immediately after turning direction at the roofline. At point B, the air pressure is on the order of −171 psf. The air pressure steadily rises along roof 14' as wind 39 begins to flow parallel to roof 14'. For example, the air pressure reaches it local maximum of approximately −82 psf at point C. As wind 39 begins its downward flow around the end of roof 14' after point C, wind 39 again accelerates, and the static air pressure at point D immediately behind the windward sidewall 12 of enclosure 20' drops to a value on the order of −104 psf. Thereafter, the air pressure steadily rises until at some point downstream of enclosure 20' the air pressure again equals the ambient atmospheric pressure.

As shown in FIG. 4A, the upstream check valve 37 housed in the upstream air duct 36 experiences the lowest of the low pressure regions (e.g., −171 psf) formed by the flow of wind 39 over enclosure 20'. Check valve 37 accordingly opens, and air is evacuated from the substantially enclosed sub-floor region of enclosure 20'. Conversely, because the static air pressure at the downstream air duct 36 is higher (e.g., −82 psf) than at the upstream air duct 36, the pressure differential between the upstream and downstream air ducts 36 (e.g., −171 psf−(−82 psf)=−89 psf) causes the downstream check valve 37 to remain closed, thus blocking air from entering substantially enclosed sub-floor region of enclosure 20' via the downstream air duct 36. The wind-produced low pressure averaged over the entire area of roof 14' (e.g., −130 psf) is a higher pressure than the vacuum created in the substantially enclosed sub-floor region of enclosure 20' (e.g., −171 psf) acting over the entire area of floor 22, resulting in a net downward force that, when operating in combination with the weight of the shelter (e.g., 12,000 lbs.), is more than sufficient to hold enclosure 20' on the underlying substrate with or, in some embodiments, without the aid of stabilizers 28.

With reference now to FIGS. 5A-5B, there are illustrated a side elevation view and corresponding static air pressure graph for the short sidewall 12 of protective shelter 10' schematically illustrating the functioning of check valves 37 and air ducts 36 during a severe (e.g., 250 mph) wind event directed against the larger sidewalls. As can be seen by comparison of FIGS. 5A-5B to FIGS. 4A-4B, check valves 37 and air ducts 36 operate the same way when wind 39 strikes a long sidewall 12 of protective shelter 10' as when wind 39 strikes a short sidewall 12 of protective shelter 10'. In particular, the upstream check valve 37 opens to evacuate the air within the substantially enclosed sub-floor region, thus creating a vacuum that resists the wind-generated uplift on protective shelter 10', while the downstream check valve 37 remains closed.

Referring now to FIGS. 6A-6B, there are depicted a front end view and left side view of an exemplary protective shelter 10' ready for transport on a standardized roll-off container transport 60. In the depicted embodiment, the roll-off container transport is a conventional roll-off container trailer, such as model GN-20 or GN-30 available from Domatex Inc. of Houston, Tex. In an alternative embodiment, roll-off container transport 60 can be a roll-off container truck. However, the invention is not limited with regard to the mode of transport that can be implemented. For example, other types of transport include, but are not limited to a ballast tractor truck, crane-truck, flat-bed truck, heavy hauler, tilt-bed Landoll with "pop-up" rollers and their similarly equipped semi-trailers. The assembly comprising protective shelter 10' and roll-off container transport 60 is preferably less than or equal to the maximum allowed DOT height, width and weight that may be traveled over public roadways without special permits or restrictions.

Currently, the maximum unpermitted DOT-compliant height and width in the United States are 168 and 102 inches, respectively. Thus, it is preferable if the maximum height of the assembly is 168 inches or less (e.g., 161 and $^{15}/_{16}$" as shown) and the maximum width is 102 inches or less. A greater variation in the length of a protective enclosure is possible while still achieving DOT compliance without securing special permits. For example, a shelter with the maximum unpermitted DOT-compliant width can have a length shorter than 7 feet and as great as 25 feet or longer.

With reference now to FIGS. 7A-7D, there are illustrated top plan, end elevation, perspective and side elevation views, respectively, of a third embodiment of the protective shelter 70. As indicated by like reference numerals, protective shelter 70 is constructed similarly to protective shelter 10 of FIGS. 1A-1D, but has an enclosure 80 of greater length to support a higher occupancy rating (e.g., 25 persons versus 12). Because of its greater length, enclosure 80 has a door 26 on each of its longer sidewalls 12 and omits stabilizers 28 on the shorter sidewalls 12.

Referring now to FIGS. 8A-8B, there are depicted a front end view and left side view of an exemplary protective shelter 70 ready for transport on a roll-off container transport 60. In the depicted embodiment, the roll-off container transport is again a conventional roll-off container trailer, such as model GN-20 or GN-30 available from Domatex Inc. of Houston, Tex. In an alternative embodiment, roll-off container transport 60 can again be a roll-off container truck. However, the invention is not limited in regard to the mode of transport that can be implemented. For example, other types of transport include, but are not limited to a ballast tractor truck, crane-truck, flat-bed truck, heavy hauler, and their similarly equipped semi-trailers such as a Landoll tilt bed trailer with "pop-up" rollers. As indicated by the exemplary dimensions given in FIGS. 8A-8B, the assembly comprising protective shelter 70 and roll-off container transport 60 is preferably less than or equal to the maximum unpermitted DOT height, width and weight that may travel over public roadways without special permits or restrictions.

Referring now to FIGS. 10A-10D, perspective, front elevation, side elevation, and top plan views of a fifth embodiment of a protective shelter 10" are depicted. As indicated by like reference numerals, the construction of protective shelter 10" is similar in many respects to that of protective shelters 10 and 10' of FIGS. 1A-1D and 2, respectively. Accordingly, protective shelter 10" includes an enclosure 20" including a floor 22, four sidewalls 12, two doors 26 and a roof 14", which may all be formed of welded plate steel. However, the invention is not necessarily limited in this regard and other construction materials may be employed. In some embodiments sidewalls 12 may be constructed by filling the void between parallel interior and exterior steel plate walls with concrete and/or ballistic ceramic. Moreover, sidewalls 12 may alternatively or additionally be externally reinforced with a layer of ballistic ceramic. The ballistic ceramic or concrete not only enhances blast and penetration resistance, but also may be utilized as a "ballast" to bring protective shelter 10" up to a desired overall weight. Sidewalls 12 may be further provided with shielded ventilation and pressure relief openings 25 (e.g., in each of a pair of opposing sidewalls 12) of sufficient size to provide prescribed pressure relief and sufficient breathing air for the rated number of shelter occupants in accordance with the ICC/NSSA 500 standard.

Figure 10A:
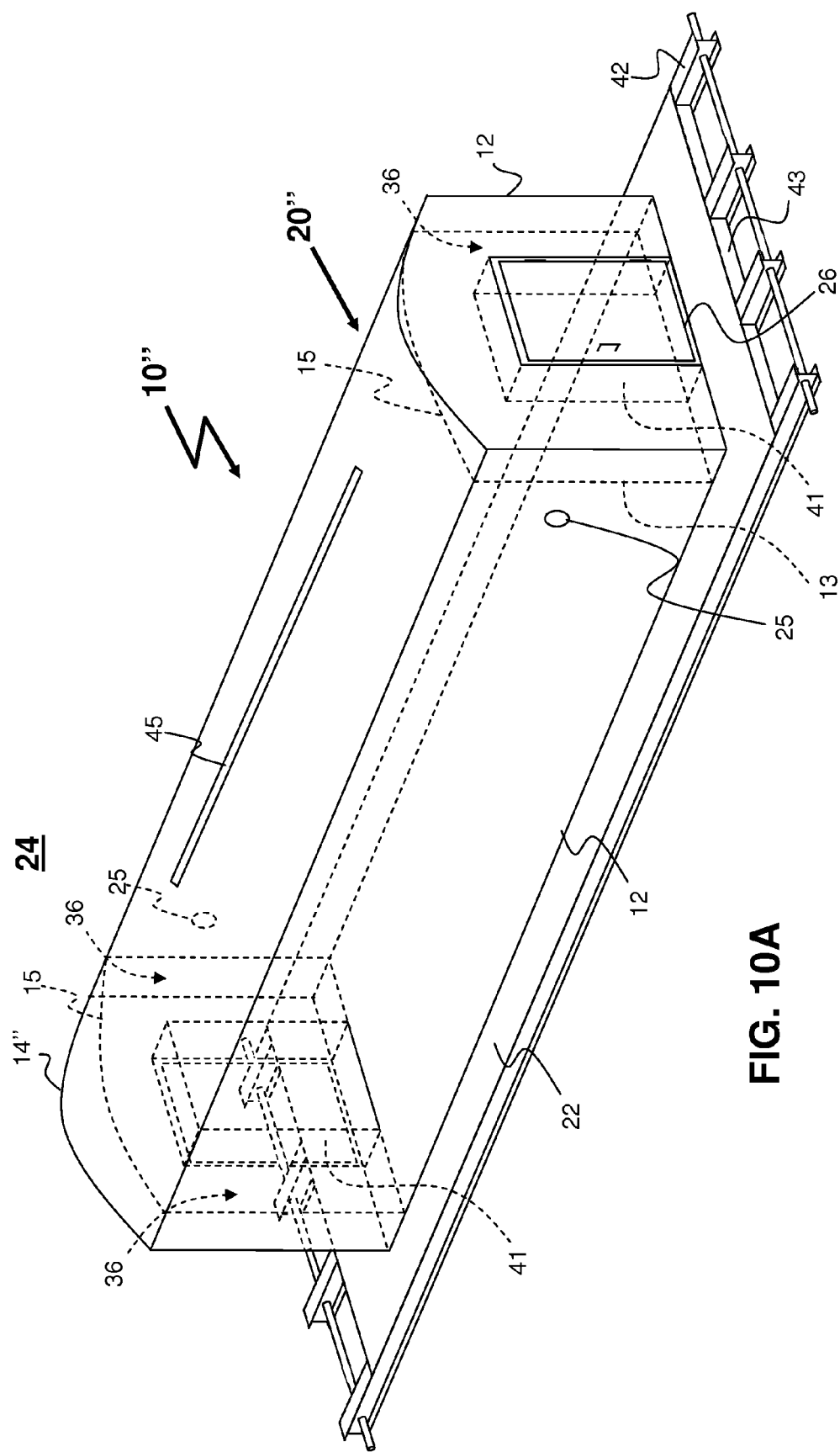
FIGS. 10A-10D respectively illustrate an entry-end perspective, short side elevation, long side elevation, and top plan views of a large capacity fifth embodiment of a protective shelter.
Figure 10B:
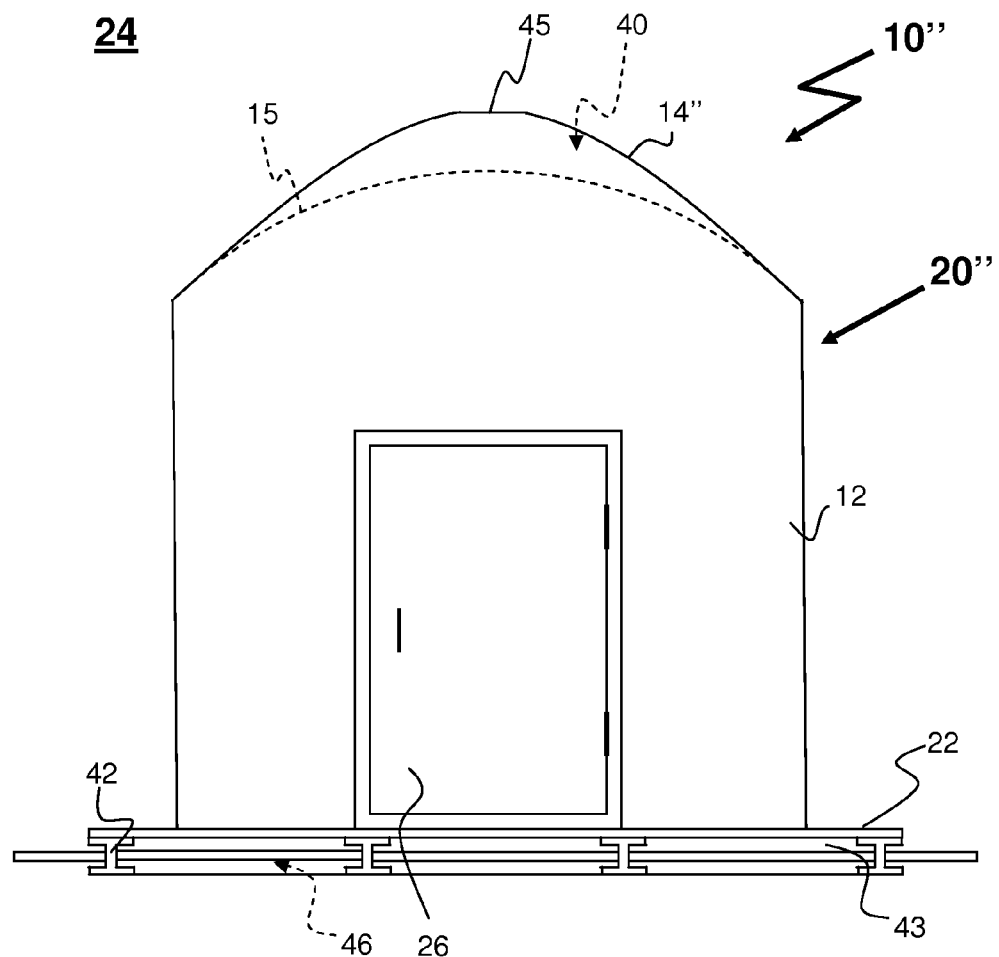

In a preferred embodiment, floor 22 of enclosure 20" is supported above the underlying substrate (e.g., ground, pavement, rig platform, etc.) when protective shelter 10" is deployed in environment 24. For example, in the illustrated embodiment floor 22 is welded to and rests upon one or more (e.g., four) undercarriage "skid" rails 42 (as illustrated in FIGS. 10A-10D) that elevate floor 22 above the substrate. Transverse beams 43 are additionally welded to undercarriage rails 42 to provide further structural support to enclosure 20". As described above, the combination of undercarriage rails and transverse beams at the periphery of floor 22 serves as a rigid skirting to form a lower substantially enclosed sub-floor region (air space) 46 below floor 22 (as depicted in FIGS. 10B and 12). The undercarriage rails and transverse beams within the enclosed sub-floor region 46 are preferably configured with openings there through (e.g., openings 1002 of FIG. 10C) and/or spacers between the rails/beams and floor 22 so as to not inhibit but to allow the free passage of air from any locale beneath the shelter to any other locale within the enclosed sub-floor region 46.

Figure 10C:
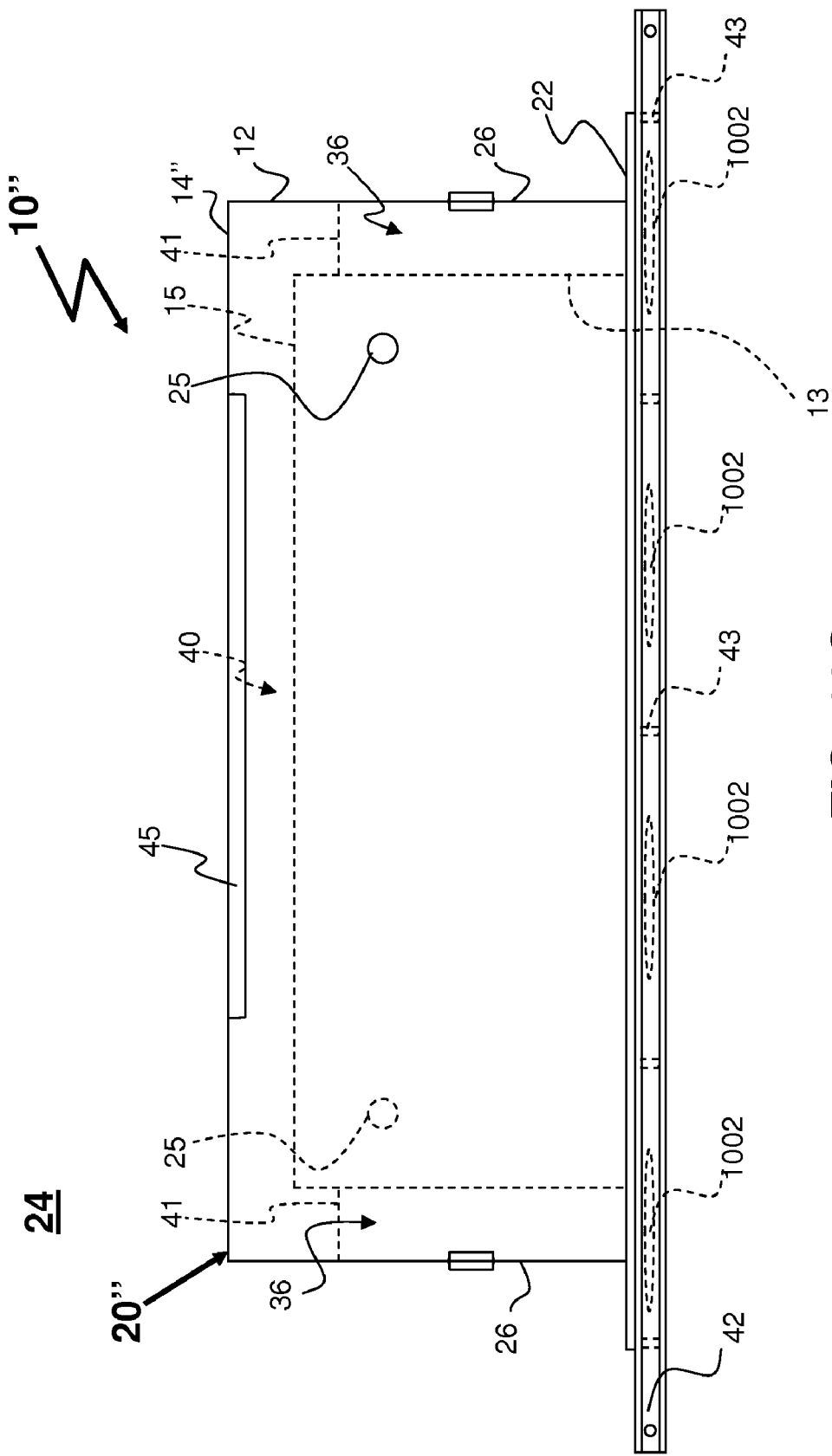
Figure 10D:
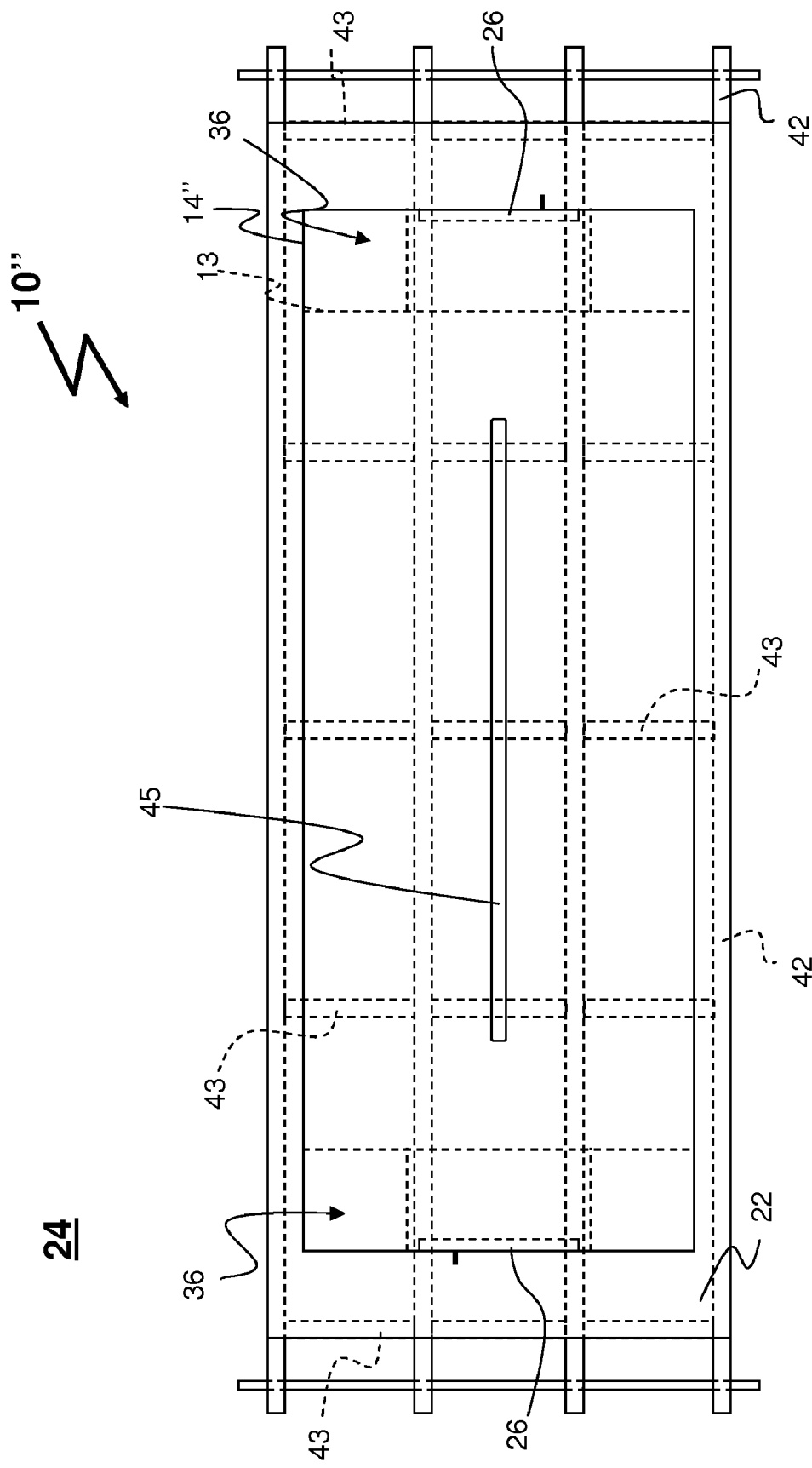

Protective shelter 10" further includes interior partitions forming airspaces communicating between substantially enclosed sub-floor region 46 and environment 24. For example, in the depicted embodiment, protective shelter 10" includes two vertical interior partitions 13 (e.g., of plate steel) spaced from and parallel to the two exterior sidewalls 12 of shorter overall length. The interior partitions further include a ceiling 15 attached to longer sidewalls 12 and to the tops of the two vertical interior partitions 13. Ceiling 15 may be formed, for example, of plate steel and may have a domed, flat or other shape. Roof 14" and ceiling 15 thus define an attic region (air space) 40 (as best seen in FIGS. 10B and 10C) between roof 14" and ceiling 15.

An enclosed doorway 41 additionally extends from each door 26 to the adjacent interior vertical partition 13. Doorways 41 and vertical interior partitions 13 thus define rectangular interior air ducts 36 on either side of doorways 41 that communicate between the substantially enclosed sub-floor basement region 46 and attic region 40.

Roof 14" further permits airspace communication between attic region 40 and environment 24 through an aperture (e.g., exterior vent 45), which can be either completely open (as shown) or partially shielded (e.g., by welded wire screening) to prevent penetration by debris. In the depicted embodiment in which protective shelter 10" has a dome-shaped roofline, exterior vent 45 is disposed at the apex of roof 14", thus harnessing the region of lowest pressure created along the apex of the roofline by the Bernoulli effect to provide vacuum-assisted resistance to uplift, sliding and overturning forces as described earlier with respect to the second and third embodiments (FIGS. 2-5B). It should be noted that because exterior vent 45 is located at the region of lowest pressure, no valving in interior air ducts 36 is required.

Although not specifically illustrated in FIGS. 10A-10D, it should be appreciated that protective shelter 10" may optionally be equipped with stabilizers 28 and feet 30 and/or a semi-rigid or flexible sub-skirt 35 as previously described, for example, with reference to FIGS. 1A-3. As described above, these additional features may be employed to increase resistance to overturning forces and to provide additional safety factor. Further, as described above with reference to protective shelters 10 and 10', protective shelter 10" may also be transported on a roll-off container transport 60, such as a conventional roll-off container trailer or roll-off container truck, or may alternatively be transported by other transport vehicles, including but not limited to a ballast tractor truck, crane-truck, flat-bed truck, heavy hauler, and similarly equipped suitable semi-trailers.

Referring now to FIG. 11, there is depicted an entry-end perspective view of the protective shelter of FIGS. 10A-10D illustrating the operation of interior air ducts 36 during a high-velocity wind event (e.g., a wind load of 250 mph or greater) directed against a longer sidewall 12. As shown, wind 39 impacts a windward longer sidewall 12 of enclosure 20" and diverts over roof 14". As wind 39 is diverted upward, wind 39 accelerates over the top of roof 14", with the static air pressure consequently dropping to its lowest value at the apex of roof 14" where exterior vent 45 is located.

The disclosed arrangement of exterior vent 45, attic region 40 and interior air ducts 36 thus passively and automatically selects the lowest air pressure created by the passage of wind 39 over roof 14" of protective shelter 10" and communicates that air pressure with substantially enclosed sub-floor region 46, thus evacuating air from substantially enclosed sub-floor region 46 via interior air ducts 36, attic region 40 and exterior vent 45 and reducing the air pressure in substantially enclosed sub-floor air space 46 to below the average atmospheric pressure of environment 24. Because the arrangement of exterior vent 45, attic region 40 and interior air ducts 36 causes air 47 to be continually withdrawn from the substantially enclosed sub-floor region 46 of protective shelter 10" under high velocity wind conditions, substantially enclosed sub-floor region 46 acts as a "suction cup" to counter uplift, sliding and overturning forces exerted by high velocity winds and to hold protective shelter 10" securely to the underlying substrate.

With reference now to FIG. 12, there is depicted side elevation view of the protective shelter of FIGS. 10A-10D illustrating the operation of interior air ducts 36, attic region 40 and exterior vent 45 during a high-velocity wind event (e.g., a wind of 250 mph or greater) directed against the shorter sidewall 12. As can be seen by comparison of FIG. 12 to FIG. 11, the arrangement of exterior vent 45, attic region 40 and interior air ducts 36 provides the same vacuum-assisted resistance to uplift, sliding and overturning forces described above when wind 39 strikes a shorter sidewall 12 of protective shelter 10". Because of the shorter length of the end walls relative to the side walls the smaller cross sectional area produces proportionately less skid force. And because the lengths of the side walls are greater, the tendency for the shelter to overturn in the longitudinal direction is much less. The vacuum effect produced when wind is perpendicular to the end walls is also less, but nonetheless sufficient to prevent sliding, overturning and uplift.

With reference now to FIGS. 13 and 14, there are depicted perspective and side views of a sixth embodiment of an exemplary protective shelter 130. As indicated by like reference numerals, the construction of protective shelter 130 is similar in some respects to that of protective shelter 90 of FIG. 9. Accordingly, protective shelter 130 includes an enclosure including a floor 22, cylindrical sidewall 12, and door 26 all formed, for example, of welded plate steel. Protective shelter 130 may optionally have stabilizers 28 and feet 30 as previously discussed.

However, unlike protective shelter 90 of FIG. 9, protective shelter 130 includes a peripheral skirt that, together with floor 22, defines a substantially enclosed sub-floor region 46. In addition, in contrast to flat roof 14 depicted in FIG. 9, protective shelter 130 includes a substantially domed roof 1314 having a single vent 1316 that enables airspace communication between a substantially enclosed sub-floor region 46 underlying floor 22 and environment 24, for example, via a central duct 36. Similar to exterior vent 45 of FIG. 10, vent 1316 is preferably centrally located at the apex of roof 1314 (i.e., at the region of lowest pressure created by the Bernoulli effect). As best seen in FIG. 14, vent 1316 and duct 36 cooperate during a high wind event to evacuate the air from substantially enclosed sub-floor region 46 and to provide the vacuum-assisted anchoring described earlier with respect to the second, third, and fifth embodiments (FIGS. 2-5B and 10A-12). It should be understood that the omni-directional vent and ducting arrangement illustrated in FIGS. 13-14 (like that depicted in the fifth embodiment illustrated in FIGS. 10A-12) does not require any internal valving to provide vacuum-assisted anchoring.

As has been described, the use of a convex roof having symmetry about at least the central longitudinal axis of a protective shelter allows winds from either direction (containing a velocity component normal that axis) to create the lowest possible static pressure at the same region on the roof regardless of wind direction. A vent opening, which can be of any shape and in some embodiments is the only such vent opening, is preferably located at or near the region of lowest static pressure and is utilized to transfer the low static pressure to the sub-floor region, providing the beneficial vacuum-assisted anchoring.

Although specific representative embodiments are illustrated and described herein, those skilled in the art should appreciate that the disclosed and many other protective shelter designs can be utilized in various embodiments. For example, the described vacuum-assisted anchoring will work with virtually any shaped roof profile (e.g., flat, mansard, sloped, domed, gabled, hipped, etc.) and with supporting walls of any configuration (e.g., square, rectangular, cylindrical, hexagonal, octagonal, irregular, etc. when viewed in plan). The use of vacuum ducting enables the lowest static pressure created by the wind to be routed to the basement of the shelter, thus generating the greatest possible vacuum holding effect. Even a single roof opening with a connecting duct to the basement will route some level of vacuum to the basement, thus reducing the net vertical forces on the protective shelter.

As various shapes and sizes of protective shelters are considered for specific implementations and specific wind-resistance ratings, it should be appreciated that appropriate selection of the shapes and sizes of the protective shelter and its components can serve to enhance the vacuum-assisted anchoring during a high-velocity wind event and to achieve desired levels of resistance to wind loads (e.g., resistance to a 200 mph wind, 250 mph wind, 300 mph wind, etc.). For example, increasing the rise of the roof peak as compared to the eve height of the protective shelter maximizes the pressure differential between the average ambient air pressure of environment 24 and that at located at vent 45 or 1316. However, the benefits of an increased roof rise are generally achieved only as long as the roof rise does not exceed half of the width (in the embodiment of FIGS. 10A-10D) or diameter (in the domed roof embodiment of FIG. 13). Further, for a given wind speed, the heavier the protective shelter, the less roof rise is needed to achieve comparable shelter performance. Consequently, in many cases, it may be desirable to make the protective shelter as heavy as is reasonable (e.g., by the addition of more or heavier steel plate or additional ballistic ceramic ballast) while still permitting the protective shelter to be loaded on a transport, transported to an installation site (preferably without special permitting), installed at the installation site and reloaded on the transport.

Vacuum-assisted anchoring can be further enhanced by increasing the area of the substantially enclosed sub-floor region relative to the vertically projected area of the roof of the protective shelter. Doing so increases the vacuum-assisted anchoring force generally in proportion to the ratio of substantially enclosed sub-floor region to the vertically projected roof area. This design enhancement is illustrated, for example, by the fifth shelter embodiment depicted in FIGS. 10A-12, in which the length of substantially enclosed sub-floor region 46 exceeds that of longer sidewalls 12.

In addition, vacuum-assisted anchoring can be amplified by implementing structures to accelerate wind speed near vent opening(s), enabling the wind speed experienced locally at a vent opening to exceed that of the ambient wind. Greater wind speed decreases static pressure and strengthens the vacuum-assisted anchoring effect. Consequently, structures accelerating wind speed near vent opening(s) can create a vacuum-assisted anchoring effect much greater than that of the ambient wind speed. Vacuum holding forces can thus be "decoupled" from that normally produced by a given wind speed, greatly enhancing the stability of a shelter against uplift, sliding and overturning forces in any given wind environment.

Figure 15:
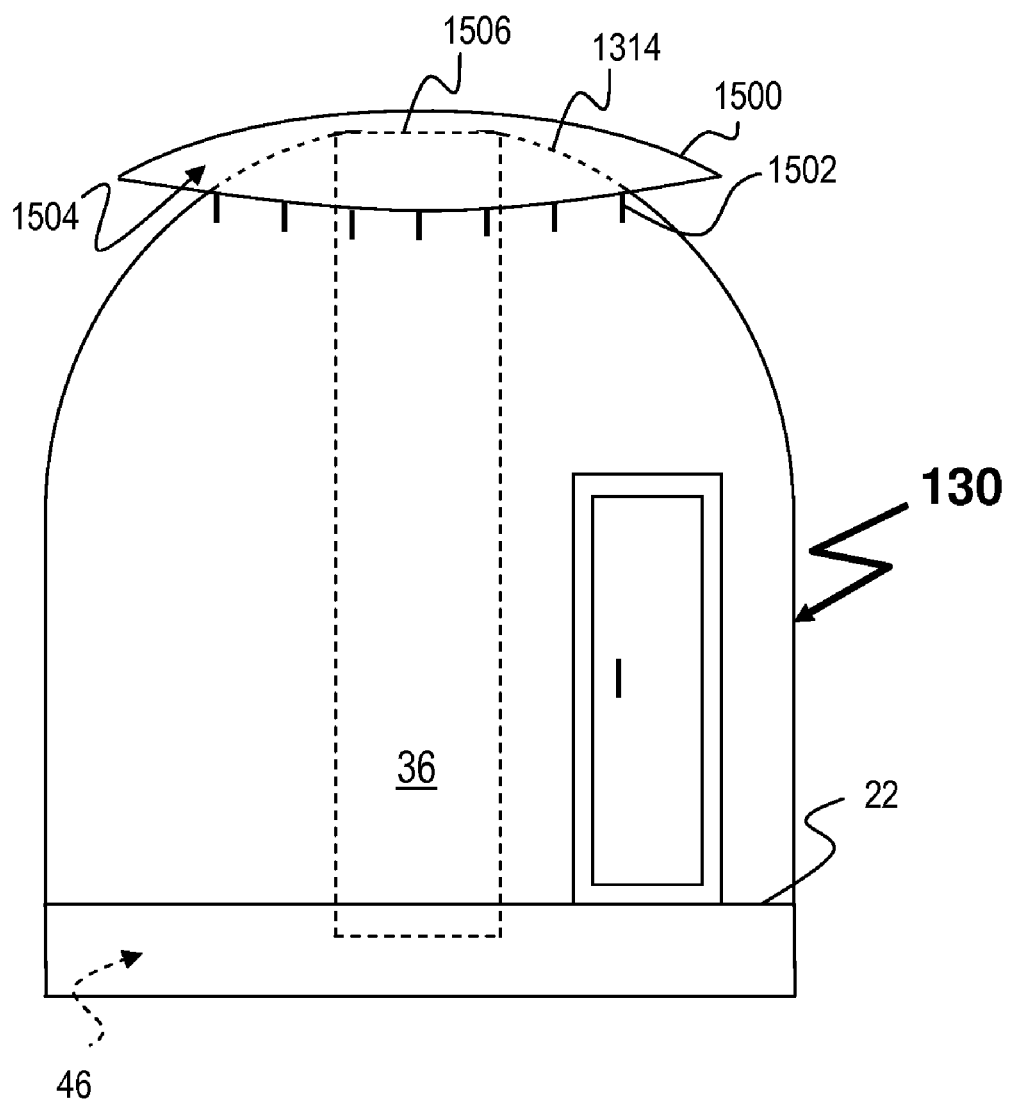
FIG. 15 is an elevation view of the protective shelter of FIG. 13 as augmented with a wind converging structure.

The structure that accelerates wind speed near the vent opening(s) can take a number of forms. In one example depicted in FIG. 15, the structure takes the form of a shroud 1500 coupled to a protective shelter 130 (as previously described) by spaced apart supports 1502 to define a converging and diverging passage 1504 between substantially domed roof 1314 and shroud 1500. Ideally, the narrowest portion of passage 1504 is adjacent to vent opening 1506. By selection of the spacing between shroud 1500 from substantially domed roof 1314, a desired and beneficial decrease in static pressure can be achieved in order to obtain a desired holding strength for protective shelter 1314. As will be appreciated, a structure that accelerates wind speed near vent openings can also be applied to other embodiments of the described protective structure, including that depicted in FIGS. 10A-10D.

It should also be understood that the roof surface(s) are not the only location on a protective structure at which low static pressures are created by a passing wind. Consequently, ducting (with or without valves) can be used to communicate low static pressure to the sub-floor region from any of various locations of low static pressure around the walls and/or roof of the protective structure in order to provide at least some degree of vacuum-assisted anchoring. For example, the leeward wall of a protective structure has relatively lower static pressures created by the passing wind. Therefore, a vent opening can be provided on the leeward wall (at any desired height above the underlying substrate) and connected by a valved duct to the sub-floor region in order to use the lower static pressure on the leeward wall to partially offset the uplift force created by the same wind passing over the roof of the protective structure.

In order to appropriate the lower static pressure available on the leeward wall for wind coming from any direction, a protective structure may incorporate a vent opening on each wall (or side), with each such vent opening covered by a flap of a flexible material serving as a valve. With this arrangement, on the windward side of the protective shelter, the flap is pressed against the vent opening, preventing the high static pressure and any air flow from being transferred to the sub-floor region. On the leeward side, by contrast, the flap valve would be lifted by air being drawn out through the vent opening due to the regional low pressure. Should the static pressure present at the side wall be lower than that induced on the leeward wall (which is often the case), then both the windward and the leeward wall flap valves would be pulled shut by the lower pressures induced at the side walls, and the side wall flap valves would be open to communicate the relatively low static pressure to the sub-floor region of the protective structure and to provide vacuum-assisted anchoring.

As has been described, a re-deployable mobile aboveground protective shelter is capable of protecting personnel and articles from high velocity wind events (e.g., winds exceeding 250 mph) and withstanding the uplifting, sliding and overturning forces generated by such high velocity wind events. In various embodiments, protective shelters may include:

An enclosure of a material and construction capable of protecting occupants and contents from high winds and the impact of wind borne debris;

An elevated floor of the enclosure that isolates the occupied interior space from the surrounding environment;

A peripheral skirt of rigid and/or semi-rigid material defining a substantially enclosed sub-floor region or air space bounded by the peripheral skirt, the elevated floor of the enclosure and the surface upon which the enclosure rests;

One or more air ducts (with and/or without unidirectional check valves) permitting air flow from the substantially enclosed sub-floor region and the external roof and/or sidewall(s), windward wall(s), and/or leeward wall(s) regions of the enclosure;

A unidirectional check valve in zero or more of the air duct(s) permitting only the evacuation of air from the substantially enclosed sub-floor region and preventing movement of air downward into the substantially enclosed sub-floor region;

At least one protective door for ingress and egress into and out of the protective shelter;

An escape hatch for emergency exit in the event a protective door is inoperable or otherwise blocked;

At least one baffled ventilation opening to provide breathing air for the rated number of occupants while preventing penetration by dangerous airborne objects;

Pressure relief openings to ensure that structural integrity is not compromised due to the internal/external pressure differential created, for example, during the passage of a tornado;

Retractable stabilizers that, when extended, increase the effective width and/or length of the enclosure to enable it to better withstand wind-induced overturning forces;

Hydraulic, pneumatic, electrical, mechanical or manual actuators used individually or in combination to raise, lower, test and lock into place all stabilizers during initial deployment of the unit and its subsequent loading for transport and/or redeployment;

Standardized attachments, cable connections, undercarriage and supports allowing for the use of DOT-compliant roll-off container transport trailers and trucks and facilitating the economic and rapid loading, transportation, unloading and deployment of the protective shelter; and/or Removable anchors (such as earth anchors or earth screws) that optionally can be inserted through stabilizer pads and/or elsewhere to augment the protective shelter's resistance to sliding.

While the present invention has been particularly shown as described with reference to one or more preferred embodiments, it will be understood by those skilled in the art that various changes in form and detail may be made therein without departing from the spirit and scope of the invention.

What is claimed is:

1. A protective shelter, comprising:
an enclosure having at least a floor, at least one sidewall coupled to the floor, and a roof coupled to the at least one sidewall, wherein the roof includes an aperture located adjacent the shelter's point of minimum static air pressure during a high-velocity wind event;
at least one support that elevates the floor from a substrate;
a peripheral skirt extending toward the substrate to form a substantially enclosed sub-floor region bounded by the peripheral skirt, the substrate and the floor;
one or more air ducts communicating between the substantially enclosed sub-floor region and an exterior region of the enclosure via the aperture; and
a ceiling spaced from the roof to form a substantially enclosed attic region below the roof and in air space communication with the aperture.

2. The protective shelter of claim 1, wherein the enclosure comprises metal plate reinforced by at least one of a set including ballistic ceramic and concrete.

3. The protective shelter of claim 1, wherein the one or more air ducts provide air flow communication between the substantially enclosed attic region with the substantially enclosed sub-floor region.

4. The protective shelter of claim 1, and further comprising:
at least one stabilizer, coupled to the enclosure, wherein the at least one stabilizer is horizontally extendable from the enclosure to contact the substrate in an extended position and retractable from the extended position.

5. The protective shelter of claim 1, wherein the roof has at least one edge region having a decreasing height at points further from a central axis of the enclosure.

6. An assembly, comprising:
a protective shelter in accordance with claim 1; and
a transport bearing the protective shelter.

7. The protective shelter of claim 1, and further comprising at least one ground anchor coupling the protective shelter to the substrate.

8. The protective shelter of claim 1, and further comprising a structure coupled to an exterior of the enclosure that increases wind velocity adjacent the aperture.

9. A protective shelter, comprising:
an enclosure formed of welded metal plate, the enclosure having at least a floor, at least one sidewall coupled to the floor, and a roof coupled to the at least one sidewall, wherein the roof includes an aperture located adjacent the shelter's point of minimum static air pressure during a high-velocity wind event;
at least one support that elevates the floor above a substrate;
a peripheral skirt extending toward the substrate to form a substantially enclosed sub-floor region bounded by the peripheral skirt, the substrate and the floor; one or more air ducts communicating between the substantially enclosed sub-floor region and an exterior region of the enclosure via the aperture;
at least one stabilizer, coupled to the enclosure, wherein the at least one stabilizer is horizontally extendable from the enclosure to contact the substrate in an extended position and retractable from the extended position; and
a ceiling spaced from the roof to form a substantially enclosed attic region below the roof and in air space communication with the aperture.

10. The protective shelter of claim 9, wherein the one or more air ducts provide air flow communication between the substantially enclosed attic region with the substantially enclosed sub-floor region.

11. The protective shelter of claim 9, wherein the roof has at least one edge region having a decreasing height at points further from a central axis of the enclosure.

12. The protective shelter of claim 9, and further comprising a structure coupled to an exterior of the enclosure that increases wind velocity adjacent the aperture.

13. An assembly, comprising:
a protective shelter in accordance with claim 9; and
a transport bearing the protective shelter.

14. A method of deploying a protective shelter, said method comprising:
transporting, to an installation site having a substrate, a protective shelter including:
an enclosure having at least a floor, at least one sidewall coupled to the floor, and a roof coupled to the at least one sidewall, wherein the roof includes an aperture located adjacent the shelter's point of minimum static air pressure during a high-velocity wind event;
at least one support that elevates the floor from the substrate; one or more air ducts communicating between a region below the floor and an exterior region of the enclosure via the aperture;
a peripheral skirt extending below the floor; and
a ceiling spaced from the roof to form a substantially enclosed attic region below the roof and in air space communication with the aperture; and
placing the protective shelter on the substrate such that the peripheral skirt forms a substantially enclosed sub-floor region bounded by the peripheral skirt, the substrate and the floor.

15. The method of claim 14, wherein transporting the protective shelter comprises transporting the protective shelter on a roll-off transport.

16. The method of claim 14, wherein:
the protective shelter further includes at least one retractable and extendable stabilizer;
the method further comprises extending from the protective shelter the at least one stabilizer in at least a horizontal direction, such that the at least one stabilizer contacts the substrate in an extended position.

17. The method of claim 14, and further comprising anchoring the protective shelter to the substrate.

18. The method of claim 17, wherein the anchoring comprises anchoring the protective shelter utilizing an earth anchor.

19. The method of claim 17, wherein:
the anchoring includes anchoring the at least one stabilizer; and
the method further comprises field-proving installation of the protective shelter to withstand a rated wind speed by attempting to overcome the anchoring of the at least one stabilizer to the substrate by applying at least a predetermined force to the at least one stabilizer.

20. A protective shelter, comprising:
an enclosure having at least a floor, at least one sidewall coupled to the floor, and a roof coupled to the at least one sidewall, wherein the enclosure includes an aperture located adjacent a point of relatively lower static air pressure during a high-velocity wind event;
at least one support that elevates the floor from a substrate;
a peripheral skirt extending toward the substrate to form a substantially enclosed sub-floor region bounded by the peripheral skirt, the substrate and the floor;
one or more air ducts communicating between the substantially enclosed sub-floor region and an exterior region of the enclosure via the aperture;

wherein the aperture is located on the roof;
a ceiling spaced from the roof to form a substantially enclosed attic region below the roof and in air space communication with the aperture; and
the one or more air ducts provide air flow communication between the substantially enclosed attic region with the substantially enclosed sub-floor region.

21. The protective shelter of claim 20, wherein the enclosure comprises metal plate reinforced by at least one of a set including ballistic ceramic and concrete.

22. The protective shelter of claim 20, and further comprising:
at least one stabilizer, coupled to the enclosure, wherein the at least one stabilizer is horizontally extendable from the enclosure to contact the substrate in an extended position and retractable from the extended position.

23. The protective shelter of claim 20, wherein the roof has at least one edge region having a decreasing height at points further from a central axis of the enclosure.

24. A protective shelter, comprising:
an enclosure having at least a floor, at least one sidewall coupled to the floor, and a roof coupled to the at least one sidewall, wherein the enclosure includes an aperture located adjacent a point of relatively lower static air pressure during a high-velocity wind event;
at least one support that elevates the floor from a substrate;
a peripheral skirt extending toward the substrate to form a substantially enclosed sub-floor region bounded by the peripheral skirt, the substrate and the floor;
one or more air ducts communicating between the substantially enclosed sub-floor region and an exterior region of the enclosure via the aperture; and
the at least one sidewall includes a first sidewall; and the aperture is located on the first sidewall.

25. The protective shelter of claim 24, wherein:
the one or more air ducts includes a first air duct in communication with the aperture on the first sidewall; and
the protective shelter further comprising a valve controlling air flow through the first air duct.

26. The protective shelter of claim 20, and further comprising a structure coupled to an exterior of the enclosure that increases wind velocity adjacent the aperture.

27. An assembly, comprising:
a protective shelter in accordance with claim 20; and
a transport bearing the protective shelter.

28. The protective shelter of claim 20, and further comprising at least one ground anchor coupling the protective shelter to the substrate.

29. A method of deploying a protective shelter, said method comprising:
transporting, to an installation site having a substrate, a protective shelter including:
an enclosure having at least a floor, at least one sidewall coupled to the floor, and a roof coupled to the at least one sidewall, wherein the enclosure includes an aperture located adjacent a point of relatively low static air pressure during a high-velocity wind event; at least one support that elevates the floor from the substrate;
one or more air ducts communicating between a region below the floor and an exterior region of the enclosure via the aperture;
a peripheral skirt extending below the floor; and
a ceiling spaced from the roof to form a substantially enclosed attic region below the roof and in air space communication with the aperture; and
placing the protective shelter on the substrate such that the peripheral skirt forms a substantially enclosed sub-floor region bounded by the peripheral skirt, the substrate and the floor.

30. The method of claim 29, wherein:
the protective shelter further includes at least one retractable and extendable stabilizer;
the method further comprises extending from the protective shelter the at least one stabilizer in at least a horizontal direction, such that the at least one stabilizer contacts the substrate in an extended position.

31. The method of claim 29, and further comprising anchoring the protective shelter to the substrate.

32. The method of claim 31, wherein the anchoring comprises anchoring the protective shelter utilizing an earth anchor.

33. The method of claim 29, wherein:
the anchoring includes anchoring the at least one stabilizer; and
the method further comprises field-proving installation of the protective shelter to withstand a rated wind speed by attempting to overcome the anchoring of the at least one stabilizer to the substrate by applying at least a predetermined force to the at least one stabilizer.

* * * * *